(12) United States Patent  
Rowe

(10) Patent No.: US 7,668,350 B2  
(45) Date of Patent: Feb. 23, 2010

(54) COMPARATIVE TEXTURE ANALYSIS OF TISSUE FOR BIOMETRIC SPOOF DETECTION

(75) Inventor: Robert K. Rowe, Corrales, NM (US)

(73) Assignee: Lumidigm, Inc., Albuquerque, NM (US)

( * ) Notice: Subject to any disclaimer, the term of this patent is extended or adjusted under 35 U.S.C. 154(b) by 617 days.

(21) Appl. No.: 11/219,006

(22) Filed: Sep. 1, 2005

(65) Prior Publication Data

US 2006/0062438 A1 Mar. 23, 2006

Related U.S. Application Data

(63) Continuation-in-part of application No. 10/818,698, filed on Apr. 5, 2004, now Pat. No. 7,147,153, application No. 11/219,006, which is a continuation-in-part of application No. 11/115,100, filed on Apr. 25, 2005, application No. 11/219,006, which is a continuation-in-part of application No. 11/115,101, filed on Apr. 25, 2005, now Pat. No. 7,394,919, application No. 11/219,006, which is a continuation-in-part of application No. 11/115,075, filed on Apr. 25, 2005.

(60) Provisional application No. 60/460,247, filed on Apr. 4, 2003, provisional application No. 60/483,281, filed on Jun. 27, 2003, provisional application No. 60/504,594, filed on Sep. 18, 2003, provisional application No. 60/552,662, filed on Mar. 10, 2004, provisional application No. 60/576,364, filed on Jun. 1, 2004, provisional application No. 60/600,867, filed on Aug. 11, 2004, provisional application No. 60/610,802, filed on Sep. 17, 2004, provisional application No. 60/654,354, filed on Feb. 18, 2005, provisional application No. 60/659,024, filed on Mar. 4, 2005, provisional application No. 60/576,364, filed on Jun. 1, 2004, provisional application No. 60/600,867, filed on Aug. 11, 2004, provisional application No. 60/610,802, filed on Sep. 17, 2004, provisional application No. 60/654,354, filed on Feb. 18, 2005, provisional application No. 60/659,024, filed on Mar. 4, 2005, provisional application No. 60/576,364, filed on Jun. 1, 2004, provisional application No. 60/600,867, filed on Aug. 11, 2004, provisional application No. 60/610,802, filed on Sep. 17, 2004, provisional application No. 60/654,354, filed on Feb. 18, 2005, provisional application No. 60/659,024, filed on Mar. 4, 2005.

(51) Int. Cl.  
*G06K 9/00* (2006.01)  
*G06T 1/00* (2006.01)  
*G06T 7/00* (2006.01)

(52) U.S. Cl. ............... 382/124; 340/5.53; 340/5.83

(58) Field of Classification Search ........... 382/115, 382/124; 340/5.53, 5.83  
See application file for complete search history.

(56) References Cited

U.S. PATENT DOCUMENTS 3,508,830 A 4/1970 Hopkins et al.

(Continued)

FOREIGN PATENT DOCUMENTS

DE 10153808 5/2003

(Continued)

OTHER PUBLICATIONS

Nixon, Kristin A., et al., "Novel Spectroscopy-Based Technology for Biometric and Liveness Verification", Biometric Technology for Human Identification, Proceedings of SPIE, vol. 5404, No. 1, XP-002458441, Apr. 12-13, 2004, pp. 287-295 (ISSN: 0277-786X).

(Continued)

*Primary Examiner*—John B Strege  
(74) *Attorney, Agent, or Firm*—Townsend and Townsend and Crew LLP

(57) ABSTRACT

Methods are described of evaluating the genuineness of a sample presented for biometric evaluation. The sample is illuminated under distinct optical conditions. Light scattered from the sample is received. Multiple images are formed, each image being formed from the received light for one of the optical conditions. A set of texture measures is generated, each texture measure being generated from one of the images. It is determined whether the generated texture measures is consistent with the sample being authentic unconcealed biological tissue.

21 Claims, 9 Drawing Sheets  
(1 of 9 Drawing Sheet(s) Filed in Color)

U.S. PATENT DOCUMENTS

| | | |
|---|---|---|
| 3,854,319 A | 12/1974 | Burroughs et al. |
| 3,872,443 A | 3/1975 | Ott |
| 3,910,701 A | 10/1975 | Henderson et al. |
| RE29,008 E | 10/1976 | Ott |
| 4,035,083 A | 7/1977 | Woodriff et al. |
| 4,142,797 A | 3/1979 | Astheimer |
| 4,169,676 A | 10/1979 | Kaiser |
| 4,170,987 A | 10/1979 | Anselmo et al. |
| 4,260,220 A | 4/1981 | Whitehead |
| 4,322,163 A | 3/1982 | Schiller |
| 4,427,889 A | 1/1984 | Muller |
| 4,537,484 A | 8/1985 | Fowler |
| 4,598,715 A | 7/1986 | Machler et al. |
| 4,653,880 A | 3/1987 | Sting et al. |
| 4,654,530 A | 3/1987 | Dybwad |
| 4,655,225 A | 4/1987 | Dahne et al. |
| 4,656,562 A | 4/1987 | Sugino |
| 4,657,397 A | 4/1987 | Oehler et al. |
| 4,661,706 A | 4/1987 | Messerschmidt et al. |
| 4,684,255 A | 8/1987 | Ford |
| 4,699,149 A | 10/1987 | Rice |
| 4,712,912 A | 12/1987 | Messerschmidt |
| 4,730,882 A | 3/1988 | Messerschmidt |
| 4,787,013 A | 11/1988 | Sugino et al. |
| 4,787,708 A | 11/1988 | Whitehead |
| 4,830,496 A | 5/1989 | Young |
| 4,853,542 A | 8/1989 | Milosevic et al. |
| 4,857,735 A | 8/1989 | Noller |
| 4,859,064 A | 8/1989 | Messerschmidt et al. |
| 4,866,644 A | 9/1989 | Shenk et al. |
| 4,867,557 A | 9/1989 | Takatani et al. |
| 4,882,492 A | 11/1989 | Schlager |
| 4,883,953 A | 11/1989 | Koashi et al. |
| 4,936,680 A | 6/1990 | Henkes et al. |
| 4,944,021 A | 7/1990 | Hoshino et al. |
| 4,975,581 A | 12/1990 | Robinson et al. |
| 5,015,100 A | 5/1991 | Doyle |
| 5,019,715 A | 5/1991 | Sting et al. |
| 5,028,787 A | 7/1991 | Rosenthal et al. |
| 5,051,602 A | 9/1991 | Sting et al. |
| 5,055,658 A | 10/1991 | Cockburn |
| 5,068,536 A | 11/1991 | Rosenthal |
| 5,070,874 A | 12/1991 | Barnes et al. |
| 5,077,803 A | 12/1991 | Kato et al. |
| 5,109,428 A | 4/1992 | Igaki et al. |
| 5,146,102 A | 9/1992 | Higuchi et al. |
| 5,158,082 A | 10/1992 | Jones |
| 5,163,094 A | 11/1992 | Prokoski et al. |
| 5,177,802 A | 1/1993 | Fujimoto et al. |
| 5,178,142 A | 1/1993 | Harjunmaa et al. |
| 5,179,951 A | 1/1993 | Knudson |
| 5,204,532 A | 4/1993 | Rosenthal |
| 5,222,495 A | 6/1993 | Clarke et al. |
| 5,222,496 A | 6/1993 | Clarke et al. |
| 5,223,715 A | 6/1993 | Taylor |
| 5,225,678 A | 7/1993 | Messerschmidt |
| 5,230,702 A | 7/1993 | Lindsay et al. |
| 5,237,178 A | 8/1993 | Rosenthal et al. |
| 5,243,546 A | 9/1993 | Maggard |
| 5,257,086 A | 10/1993 | Fateley et al. |
| 5,258,922 A | 11/1993 | Grill |
| 5,267,152 A | 11/1993 | Yang et al. |
| 5,268,749 A | 12/1993 | Weber et al. |
| 5,291,560 A | 3/1994 | Daugman |
| 5,299,570 A | 4/1994 | Hatschek |
| 5,303,026 A | 4/1994 | Strobl et al. |
| 5,311,021 A | 5/1994 | Messerschmidt |
| 5,313,941 A | 5/1994 | Braig et al. |
| 5,321,265 A | 6/1994 | Block |
| 5,331,958 A | 7/1994 | Oppenheimer |
| 5,348,003 A | 9/1994 | Caro |
| 5,351,686 A | 10/1994 | Steuer et al. |
| 5,355,880 A | 10/1994 | Thomas et al. |
| 5,360,004 A | 11/1994 | Purdy et al. |
| 5,361,758 A | 11/1994 | Hall et al. |
| 5,366,903 A | 11/1994 | Lundsgaard et al. |
| 5,372,135 A | 12/1994 | Mendelson et al. |
| 5,379,764 A | 1/1995 | Barnes et al. |
| 5,402,778 A | 4/1995 | Chance |
| 5,405,315 A | 4/1995 | Khuri et al. |
| 5,413,098 A | 5/1995 | Benaron et al. |
| 5,419,321 A | 5/1995 | Evans |
| 5,435,309 A | 7/1995 | Thomas et al. |
| 5,441,053 A | 8/1995 | Lodder et al. |
| 5,452,723 A | 9/1995 | Wu et al. |
| 5,459,317 A | 10/1995 | Small et al. |
| 5,459,677 A | 10/1995 | Kowalski et al. |
| 5,460,177 A | 10/1995 | Purdy et al. |
| 5,483,335 A | 1/1996 | Tobias |
| 5,494,032 A | 2/1996 | Robinson et al. |
| 5,505,726 A | 4/1996 | Meserol |
| 5,507,723 A | 4/1996 | Keshaviah |
| 5,515,847 A | 5/1996 | Braig et al. |
| 5,518,623 A | 5/1996 | Keshaviah et al. |
| 5,523,054 A | 6/1996 | Switalski et al. |
| 5,533,509 A | 7/1996 | Koashi et al. |
| 5,537,208 A | 7/1996 | Bertram et al. |
| 5,539,207 A | 7/1996 | Wong et al. |
| 5,552,997 A | 9/1996 | Massart |
| 5,559,504 A | 9/1996 | Itsumi et al. |
| 5,568,251 A | 10/1996 | Davies et al. |
| 5,596,992 A | 1/1997 | Haaland et al. |
| 5,606,164 A | 2/1997 | Price et al. |
| 5,613,014 A | 3/1997 | Eshera et al. |
| 5,630,413 A | 5/1997 | Thomas et al. |
| 5,636,633 A | 6/1997 | Messerschmidt et al. |
| 5,655,530 A | 8/1997 | Messerschmidt |
| 5,672,864 A | 9/1997 | Kaplan |
| 5,672,875 A | 9/1997 | Block et al. |
| 5,677,762 A | 10/1997 | Ortyn et al. |
| 5,681,273 A | 10/1997 | Brown |
| 5,708,593 A | 1/1998 | Saby et al. |
| 5,719,399 A | 2/1998 | Alfano et al. |
| 5,719,950 A | 2/1998 | Osten et al. |
| 5,724,268 A | 3/1998 | Sodickson et al. |
| 5,729,619 A | 3/1998 | Puma |
| 5,737,439 A | 4/1998 | Lapsley et al. |
| 5,743,262 A | 4/1998 | Lepper, Jr. et al. |
| 5,747,806 A | 5/1998 | Khalil |
| 5,750,994 A | 5/1998 | Schlager |
| 5,751,835 A | 5/1998 | Topping et al. |
| 5,761,330 A | 6/1998 | Stoianov et al. |
| 5,782,755 A | 7/1998 | Chance et al. |
| 5,792,050 A | 8/1998 | Alam et al. |
| 5,792,053 A | 8/1998 | Skladner et al. |
| 5,793,881 A | 8/1998 | Stiver et al. |
| 5,796,858 A | 8/1998 | Zhou et al. |
| 5,808,739 A | 9/1998 | Turner et al. |
| 5,818,048 A | 10/1998 | Sodickson et al. |
| 5,823,951 A | 10/1998 | Messerschmidt et al. |
| 5,828,066 A | 10/1998 | Messerschmidt |
| 5,830,132 A | 11/1998 | Robinson |
| 5,830,133 A | 11/1998 | Osten et al. |
| 5,850,623 A | 12/1998 | Carman, Jr. et al. |
| 5,853,370 A | 12/1998 | Chance et al. |
| 5,857,462 A | 1/1999 | Thomas et al. |
| 5,860,421 A | 1/1999 | Eppstein et al. |
| 5,867,265 A | 2/1999 | Thomas |
| 5,886,347 A | 3/1999 | Inoue et al. |
| 5,902,033 A | 5/1999 | Levis et al. |
| 5,914,780 A | 6/1999 | Turner et al. |
| 5,929,443 A | 7/1999 | Alfano et al. |
| 5,933,792 A | 8/1999 | Anderson et al. |
| 5,935,062 A | 8/1999 | Messerschmidt et al. |

| | | | |
|---|---|---|---|
| 5,945,676 | A | 8/1999 | Khalil |
| 5,949,543 | A | 9/1999 | Bleier et al. |
| 5,957,841 | A | 9/1999 | Maruo et al. |
| 5,961,449 | A | 10/1999 | Toida et al. |
| 5,963,319 | A | 10/1999 | Jarvis et al. |
| 5,987,346 | A | 11/1999 | Benaron et al. |
| 5,999,637 | A | 12/1999 | Toyoda et al. |
| 6,005,722 | A | 12/1999 | Butterworth et al. |
| 6,016,435 | A | 1/2000 | Maruo et al. |
| 6,025,597 | A | 2/2000 | Sterling et al. |
| 6,026,314 | A | 2/2000 | Amerov et al. |
| 6,028,773 | A | 2/2000 | Hundt |
| 6,031,609 | A | 2/2000 | Funk et al. |
| 6,034,370 | A | 3/2000 | Messerschmidt |
| 6,040,578 | A | 3/2000 | Malin et al. |
| 6,041,247 | A | 3/2000 | Weckstrom et al. |
| 6,041,410 | A | 3/2000 | Hsu et al. |
| 6,043,492 | A | 3/2000 | Lee et al. |
| 6,044,285 | A | 3/2000 | Chaiken et al. |
| 6,045,502 | A | 4/2000 | Eppstein et al. |
| 6,046,808 | A | 4/2000 | Fately |
| 6,049,727 | A | 4/2000 | Crothall |
| 6,056,738 | A | 5/2000 | Marchitto et al. |
| 6,057,925 | A | 5/2000 | Anthon |
| 6,061,581 | A | 5/2000 | Alam et al. |
| 6,061,582 | A | 5/2000 | Small et al. |
| 6,066,847 | A | 5/2000 | Rosenthal |
| 6,069,689 | A | 5/2000 | Zeng et al. |
| 6,070,093 | A | 5/2000 | Oosta et al. |
| 6,073,037 | A | 6/2000 | Alam et al. |
| 6,081,612 | A | 6/2000 | Gutkowicz-Krusin et al. |
| 6,088,605 | A | 7/2000 | Griffith et al. |
| 6,088,607 | A | 7/2000 | Diab et al. |
| 6,097,035 | A | 8/2000 | Belongie et al. |
| 6,100,811 | A | 8/2000 | Hsu et al. |
| 6,115,484 | A | 9/2000 | Bowker et al. |
| 6,115,673 | A | 9/2000 | Malin et al. |
| 6,122,042 | A | 9/2000 | Wunderman et al. |
| 6,122,394 | A | 9/2000 | Neukermans et al. |
| 6,122,737 | A | 9/2000 | Bjorn et al. |
| 6,125,192 | A | 9/2000 | Bjorn et al. |
| 6,141,101 | A | 10/2000 | Bleier et al. |
| 6,147,749 | A | 11/2000 | Kubo et al. |
| 6,148,094 | A | 11/2000 | Kinsella |
| 6,152,876 | A | 11/2000 | Robinson et al. |
| 6,154,658 | A | 11/2000 | Caci |
| 6,157,041 | A | 12/2000 | Thomas et al. |
| 6,159,147 | A | 12/2000 | Lichter et al. |
| 6,172,743 | B1 | 1/2001 | Kley et al. |
| 6,175,407 | B1 | 1/2001 | Sartor |
| 6,181,414 | B1 | 1/2001 | Raz et al. |
| 6,181,958 | B1 | 1/2001 | Steuer et al. |
| 6,188,781 | B1 | 2/2001 | Brownlee |
| 6,208,749 | B1 | 3/2001 | Gutkowicz-Krusin |
| 6,212,424 | B1 | 4/2001 | Robinson |
| 6,226,541 | B1 | 5/2001 | Eppstein et al. |
| 6,229,908 | B1 | 5/2001 | Edmonds et al. |
| 6,230,034 | B1 | 5/2001 | Messerschmidt et al. |
| 6,236,047 | B1 | 5/2001 | Malin et al. |
| 6,240,306 | B1 | 5/2001 | Rohrscheib et al. |
| 6,240,309 | B1 | 5/2001 | Yamashita et al. |
| 6,241,663 | B1 | 6/2001 | Wu et al. |
| 6,256,523 | B1 | 7/2001 | Diab et al. |
| 6,272,367 | B1 | 8/2001 | Chance |
| 6,280,381 | B1 | 8/2001 | Malin et al. |
| 6,282,303 | B1 | 8/2001 | Brownlee |
| 6,285,895 | B1 | 9/2001 | Ristolainen et al. |
| 6,292,576 | B1 | 9/2001 | Brownlee |
| 6,301,375 | B1 | 10/2001 | Choi |
| 6,301,815 | B1 | 10/2001 | Sliwa |
| 6,304,767 | B1 | 10/2001 | Soller et al. |
| 6,307,633 | B1 | 10/2001 | Mandella et al. |
| 6,309,884 | B1 | 10/2001 | Cooper et al. |
| 6,317,507 | B1 | 11/2001 | Dolfing et al. |
| 6,324,310 | B1 | 11/2001 | Brownlee |
| 6,330,346 | B1 | 12/2001 | Peterson et al. |
| 6,404,904 | B1 | 6/2002 | Einighammer et al. |
| 6,419,361 | B2 | 7/2002 | Cabib et al. |
| 6,483,929 | B1 | 11/2002 | Murakami et al. |
| 6,504,614 | B1 | 1/2003 | Messerschmidt et al. |
| 6,537,225 | B1 | 3/2003 | Mills |
| 6,560,352 | B2 | 5/2003 | Rowe et al. |
| 6,574,490 | B2 | 6/2003 | Abbink et al. |
| 6,606,509 | B2 | 8/2003 | Schmitt |
| 6,628,809 | B1 | 9/2003 | Rowe et al. |
| 6,631,199 | B1 | 10/2003 | Topping et al. |
| 6,741,729 | B2 | 5/2004 | Bjorn et al. |
| 6,799,275 | B1 | 9/2004 | Bjorn |
| 6,799,726 | B2 | 10/2004 | Stockhammer |
| 6,816,605 | B2 | 11/2004 | Rowe et al. |
| 6,825,930 | B2 | 11/2004 | Cronin et al. |
| 6,928,181 | B2 | 8/2005 | Brooks |
| 6,937,885 | B1 | 8/2005 | Lewis et al. |
| 6,958,194 | B1 | 10/2005 | Hopper et al. |
| 6,995,384 | B2 | 2/2006 | Lee et al. |
| 7,147,153 | B2 | 12/2006 | Rowe et al. |
| 7,347,365 | B2 | 3/2008 | Rowe |
| 2002/0009213 | A1 | 1/2002 | Rowe et al. |
| 2002/0101566 | A1 | 8/2002 | Elsner et al. |
| 2002/0171834 | A1 | 11/2002 | Rowe et al. |
| 2002/0183624 | A1 | 12/2002 | Rowe et al. |
| 2003/0044051 | A1 | 3/2003 | Fujieda |
| 2003/0078504 | A1 | 4/2003 | Rowe |
| 2003/0223621 | A1 | 12/2003 | Rowe et al. |
| 2004/0008875 | A1 | 1/2004 | Linares |
| 2004/0047493 | A1 | 3/2004 | Rowe et al. |
| 2004/0114783 | A1 | 6/2004 | Spycher et al. |
| 2004/0125994 | A1* | 7/2004 | Engels et al. ............... 382/124 |
| 2004/0179722 | A1 | 9/2004 | Moritoki et al. |
| 2004/0240712 | A1 | 12/2004 | Rowe et al. |
| 2004/0240713 | A1 | 12/2004 | Hata |
| 2005/0007582 | A1 | 1/2005 | Villers et al. |
| 2005/0180620 | A1 | 8/2005 | Takiguchi |
| 2005/0185847 | A1 | 8/2005 | Rowe |
| 2005/0205667 | A1 | 9/2005 | Rowe |
| 2005/0265585 | A1 | 12/2005 | Rowe |
| 2005/0265586 | A1 | 12/2005 | Rowe et al. |
| 2005/0271258 | A1 | 12/2005 | Rowe |
| 2006/0002597 | A1 | 1/2006 | Rowe |
| 2006/0002598 | A1 | 1/2006 | Rowe et al. |
| 2006/0115128 | A1 | 6/2006 | Mainguet |
| 2006/0202028 | A1 | 9/2006 | Rowe |
| 2006/0210120 | A1 | 9/2006 | Rowe |
| 2006/0274921 | A1 | 12/2006 | Rowe |

FOREIGN PATENT DOCUMENTS

| | | | |
|---|---|---|---|
| EP | 0 280 418 | A1 | 8/1988 |
| EP | 0 372 748 | | 6/1990 |
| EP | 0 897 164 | A2 | 2/1999 |
| EP | 0 924 656 | A2 | 6/1999 |
| EP | 1 353 292 | | 10/2003 |
| EP | 1 434 162 | A2 | 6/2004 |
| FR | 2761180 | A1 | 9/1998 |
| JP | 2001-184490 | A | 7/2001 |
| JP | 2002-133402 | A | 5/2002 |
| JP | 2003-308520 | A | 10/2003 |
| WO | WO 92/00513 | A1 | 1/1992 |
| WO | WO 92/17765 | A1 | 10/1992 |
| WO | WO 93/07801 | A1 | 4/1993 |
| WO | WO 01/18332 | A1 | 3/2001 |
| WO | WO 01/27882 | A2 | 4/2001 |
| WO | WO 01/52180 | A1 | 7/2001 |
| WO | WO 01/52726 | A1 | 7/2001 |
| WO | WO 01/53805 | A1 | 7/2001 |
| WO | WO 01/65471 | A | 9/2001 |

| WO | WO 02/084605 A2 | 10/2002 |
| WO | WO 02/099393 A2 | 12/2002 |
| WO | WO 03/096272 A1 | 11/2003 |
| WO | WO 2004/068388 A2 | 8/2004 |
| WO | WO 2004/068394 A1 | 8/2004 |
| WO | WO 2004/090786 | 10/2004 |
| WO | WO 2006/049394 A | 5/2006 |

OTHER PUBLICATIONS

Bantle, John P. et al., "Glucose Measurement In Patients With Diabetes Mellitus With Dermal Interstitial Fluid," Mosby-Year Book, Inc., 9 pages, 1997.

Berkoben, Michael S. et al., "Vascular Access For Hemodialysis," Clinical Dialysis, Third Edition, pp. 2 cover pages and 26-45, 1995.

Bleyer, Anthony J. et al., "The Costs Of Hospitalizations Due To Hemodialysis Access Management," Nephrology News & Issues, pp. 19, 20 and 22, Jan. 1995.

Daugirdas, JT et al., "Comparison Of Methods To Predict The Equilibrated Kt/V (eKt/V) In The Hemo Study," National Institutes of Health, pp. 1-28, Aug. 20, 1996.

Demos, S. G. et al., "Optical Fingerprinting Using Polarisation Contrast Improvement," Electronics Letters, vol. 33, No. 7, pp. 582-584, Mar. 27, 1997.

Depner, Thomas A. et al., "Clinical Measurement Of Blood Flow In Hemodialysis Access Fistulae And Grafts By Ultrasound Dilution," Division of Nephrology, University of California, pp. M745-M748, published on or before Oct. 30, 1997.

Fresenius USA, "Determination Of Delivered Therapy Through Measurement Of Effective Clearance," 2 pages, Dec. 1994.

Hakim, Raymond M. et al., "Effects Of Dose Of Dialysis On Morbidity And Mortality," American Journal of Kidney Diseases, vol. 23, No. 5, pp. 661-669, May 1994.

Jacobs, Paul et al., "A Disposable Urea Sensor For Continuous Monitoring Of Hemodialysis Efficiency," ASAIO Journal, pp. M353-M358, 1993.

Keshaviah, Prakash R. et al., "On-Line Monitoring Of The Delivery Of The Hemodialysis Prescription," Pediatric Nephrology, vol. 9, pp. S2-S8, 1995.

Krivitski, Nikolai M., "Theory And Validation Of Access Flow Measurement By Dilution Technique During Hemodialysis," Kidney International, vol. 48, pp. 244-250, 1995.

Marbach, Ralf, "Measurement Techniques For IR Spectroscopic Blood Glucose Determination," Fortschritt Bericht, Series 8: Measurement And Control Technology, No. 346, pp. cover and 1-158, Mar. 28, 1994.

Mardia, K.V. et al., "Chapter 11—Discriminant Analysis," Multivariate Analysis, pp. 2 cover pages and 300-325, 1979.

Nichols, Michael G. et al., "Design And Testing Of A White-Light, Steady-State Diffuse Reflectance Spectrometer For Determination Of Optical Properties Of Highly Scattering Systems," Applied Optics, vol. 36, No. 1, pp. 93-104, Jan. 1, 1997.

Ripley, B. D., "Chapter 3—Linear Discriminant Analysis," Pattern Recognition And Neural Networks, pp. 3 cover pages and 91-120, 1996.

Ronco, C. et al., "On-Line Urea Monitoring : A Further Step Towards Adequate Dialysis Prescription And Delivery," The International Journal of Artificial Organs, vol. 18, No. 9, pp. 534-543, 1995.

Service, F. John et al., "Dermal Interstitial Glucose As An Indicator Of Ambient Glycemia," Diabetes Care, vol. 20, No. 9, 8 pages, Aug. 1997.

Sherman, Richard A., "Chapter 4—Recirculation In The Hemodialysis Access," Principles and Practice of Dialysis, pp. 2 cover pages and 38-46, 1994.

Sherman, Richard A., "The Measurement Of Dialysis Access Recirculation," American Journal of Kidney Diseases, vol. 22, No. 4, pp. 616-621, Oct. 1993.

Steuer, Robert R. et al., "A New Optical Technique For Monitoring Hematocrit And Circulating Blood Volume: Its Application In Renal Dialysis," Dialysis & Transplantation, vol. 22, No. 5, pp. 260-265, May 1993.

Webb, Paul, "Temperatures Of Skin, Subcutaneous Tissue, Muscle And Core In Resting Men In Cold, Comfortable And Hot Conditions," European Journal of Applied Physiology, vol. 64, pp. 471-476, 1992.

Zavala, Albert et al., "Using Fingerprint Measures To Predict Other Anthropometric Variables," Human Factors, vol. 17, No. 6, pp. 591-602, 1975.

Anderson, C. E. et al., "Fundamentals of Calibration Transfer Through Procrustes Analysis," Appln. Spectros., vol. 53, No. 10 (1999) p. 1268-1276.

Ashbourn, Julian, Biometrics; Advanced Identity Verification, Springer, 2000, pp. 63-64).

Blank, T.B. et al., "Transfer on Near-Infrared Multivariate Calibrations Without Standards," Anal. Chem., vol. 68 (1996) p. 2987.

Brasunas John C. et al., "Uniform Time-Sampling Fourier Transform Spectroscopy," Applied Optics, vol. 36, No. 10, Apr. 1, 1997, pp. 2206-2210.

Brault, James W., "New Approach to High-Precision Fourier Transform Spectrometer Design," Applied Optics, Vo. 35, No. 16, Jun. 1, 1996, pp. 2891-2896.

Brochure entitled "Improve the Clinical Outcome of Every Patient", In Line Diagnostics, published on or before Oct. 30, 1997, 2 pages.

Chang, Chong-Min et al., "An Uniform Rectangular Illuminating Optical System for Liquid Crystal Light Valve Projectors," Euro Display '96 (1996) pp. 257-260.

Coyne, Lawrence J. et al., "Distributive Fiber Optic couplers Using Rectangular Lightguides as Mixing Elements," (Information Gatekeepers, Inc. Brookline, MA, 1979) pp. 160-164.

de Noord, Onno E., "Multivariate Calibration Standardization," Chemometrics and intelligent Laboratory System 25, (1994) pp. 85-97.

Despain, Alvin M. et al., "A Large-Aperture Field-Widened Interferometer-Spectrometer for Airglow Studies," Aspen International Conference on Fourier Spectroscopy, 1970, pp. 293-300.

Faber, Nicolaas, "Multivariate Sensitivity for the Interpretation of the Effect of Spectral Pretreatment Methods on Near-Infrared Calibration Model Predictions," Analytical Chemistry, vol. 71, No. 3, Feb. 1, 1999, pp. 557-565.

Geladi, Paul et al., A Mulivariate NIR Study of Skin Alterations in Diabetic Patients as Compared to Control Subjects, J. Near Infrared Spectrosc., vol. 8 (2000) pp. 217-227.

Lee et al., "Fingerprint Recognition Using Principal Gabor Basis Function", Proceedings of 2001 International Symposium on Intelligent Multimedia, Video and Speech Processing, May 2-4, 2001, Sections 2-3.

Pan et al., "Face Recognition in Hyperspectral Images", IEEE Transactions on Pattern Analysis and Machine Intelligence vol. 25, No. 12, Dec. 2003.

Ross et al., "A Hybrid Fingerprint Matcher," Pattern Recognition 36, The Journal of the Pattern Recognition Society, 2003 Elsevier Science Ltd., pp. 1661-1673.

Selvaraj et al., Fingerprint Verification Using Wavelet Transform, Proceedings of the Fifth International Conference on Computational Intelligence and Multimedia Applications, IEEE, 2003.

* cited by examiner

Planes:[3 2 1]

Planes:[5 4 5]

Planes:[5 3 1]

Planes:[6]

Planes:[3 2 1]

Planes:[5 4 5]

Planes:[5 3 1]

Planes:[6]

COMPARATIVE TEXTURE ANALYSIS OF TISSUE FOR BIOMETRIC SPOOF DETECTION

CROSS-REFERENCES TO RELATED APPLICATIONS

This application is a continuation-in-part of U.S. patent application Ser. No. 10/818,698, entitled "MULTISPECTRAL BIOMETRIC SENSOR," filed Apr. 5, 2004 by Robert K. Row. et al., which is a nonprovisional of each of U.S. Prov. Pat. Appl. No. 60/460,247, filed Apr. 4, 2003, U.S. Prov. Pat. Appl. No. 60/483,281, filed Jun. 27, 2003, U.S. Prov. Pat. Appl. No. 60/504,594, filed Sep. 18, 2003, and U.S. Prov. Pat. Appl. No. 60/552,662, filed Mar. 10, 2004.

This application is also a continuation-in-part of U.S. patent application Ser. No. 11/115,100, entitled "MULTI-SPECTRAL IMAGING BIOMETRICS," filed Apr. 25, 2005 by Robert K. Rowe, which is a nonprovisional of each of U.S. Prov. Pat. Appl. No. 60/576,364, filed Jun. 1, 2004, U.S. Prov. Pat. Appl. No. 60/600,867, filed Aug. 11, 2004, U.S. Prov. Pat. Appl. No. 60/610,802, filed Sep. 17, 2004, U.S. Prov. Pat. Appl. No. 60/654,354, filed Feb. 18, 2005, and U.S. Prov. Pat. Appl. No. 60/659,024, filed Mar. 4, 2005.

This application is also a continuation-in-part of U.S. patent application Ser. No. 11/115,101, entitled "MULTI-SPECTRAL BIOMETRIC IMAGING," filed Apr. 25, 2005 by Robert K. Rowe and Stephen P. Corcoran, which is a nonprovisional of each of U.S. Prov. Pat. Appl. No. 60/576,364, filed Jun. 1, 2004, U.S. Prov. Pat. Appl. No. 60/600,867, filed Aug. 11, 2004, U.S. Prov. Pat. Appl. No. 60/610,802, filed Sep. 17, 2004, U.S. Prov. Pat. Appl. No. 60/654,354, filed Feb. 18, 2005, and U.S. Prov. Pat. Appl. No. 60/659,024, filed Mar. 4, 2005.

This application is also a continuation-in-part of U.S. patent application Ser. No. 11/115,075, entitled "MULTI-SPECTRAL LIVENESS DETERMINATION," FILED Apr. 25, 2005 by Robert K. Rowe, which is a nonprovisional of each of U.S. Prov. Pat. Appl. No. 60/576,364, filed Jun. 1, 2004, U.S. Prov. Pat. Appl. No. 60/600,867, filed Aug. 11, 2004, U.S. Prov. Pat. Appl. No. 60/610,802, filed Sep. 17, 2004, U.S. Prov. Pat. Appl. No. 60/654,354, filed Feb. 18, 2005, and U.S. Prov. Pat. Appl. No. 60/659,024, filed Mar. 4, 2005.

This application is related to the following copending, commonly assigned applications: U.S. Prov. Pat. Appl. No. 60/610,802, entitled "FINGERPRINT SPOOF DETECTION USING MULTISPECTRAL IMAGING," filed Sep. 17, 2004 by Robert K. Rowe; and U.S. patent application Ser. No. 11/015,732, entitled "COMBINED TOTAL-INTERNAL-REFLECTANCE AND TISSUE IMAGING SYSTEMS AND METHODS," filed Dec. 17, 2004 by Robert K. Rowe. Each application identified in the paragraphs above is incorporated herein by reference in its entirety for all purposes. The applications identified above, including the applications to which the benefit of an early filing date is explicitly claimed, are sometimes referred to collectively herein as "the related applications."

BACKGROUND OF THE INVENTION

This application relates generally to biometrics. More specifically, this applications relates to methods and systems for detecting attempts to spoof biometric systems.

"Biometrics" refers generally to the statistical analysis of characteristics of living bodies. One category of biometrics includes "biometric identification," which commonly operates under one of two modes to provide automatic identification of people or to verify purported identities of people. Biometric sensing technologies measure he physical features or behavioral characteristics of a person and compare those features to similar prerecorded measurements to determine whether there is a match. Physical features that are commonly used for biometric identification include faces, irises, hand geometry, vein structure, and fingerprint patterns, which is the most prevalent of all biometric-identification features. Current methods for analyzing collected fingerprints include optical, capacitive, radio-frequency, thermal, ultrasonic, and several other less common techniques.

Most of the fingerprint-collection methods rely on measuring characteristics of the skin at or very near the surface of a finger. In particular, optical fingerprint readers typically rely on the presence or absence of a difference in the index of refraction between the sensor platen and the finger placed on it. When the angle of light at an interface is greater than the critical angle and an air-filled valley of the fingerprint is present at a particular location of the platen, total internal reflectance ("TIR") occurs in the platen because of the air-platen index difference. Alternatively, if skin of the proper index of refraction is in optical contact with the platen, the TIR at this location is "frustrated," allowing light to traverse the platen-skin interface. A map of the differences in TIR across the region where the finger is touching the platen forms the basis for a conventional optical fingerprint reading. There are a number of optical arrangements used to detect this variation of the optical interface in both bright-field and dark-field optical arrangements. Commonly, a single quasimonochromatic beam of light is used to perform this TIR-based measurement.

There also exists non-TIR optical fingerprint sensors. Some non-TIR contact sensors rely on some arrangement of quasimonochromatic light to illuminate the front, sides, or back of a fingertip, causing the light to diffuse through the skin. The fingerprint image is formed because of the differences in light transmission through the finger and across the skin-platen interface for the ridge and valleys. The difference in optical transmission at the interface is due to changes in the Fresnel reflection characteristics that result from the presence or absence of intermediate air gaps in the valleys. Some non-TIR sensors are non-contact sensors, which use polarized light to image the surface features of the finger. In some cases the imaging system may include a linear polarizer and the illumination light may be polarized in parallel and perpendicular directions to provide two images, which are then combined in some manner to enhance the surface features of the finger.

Although optical fingerprint readers based on TIR phenomena are one of the most commonly deployed types of fingerprint sensors, they are susceptible to image-quality problems due to non-ideal conditions. If the skin is overly dry, the index match with the platen will be compromised, resulting in poor image contrast. Similarly, if the finger is very wet, the valleys may fill with water, causing an optical coupling to occur all across the fingerprint region and greatly reduce image contrast. Similar effects may occur if the pressure of the finger on the platen is too little or too great, the skin or sensor is dirty, the skin is aged and/or worn, or overly fine features are present such as may be the case for certain ethnic groups and in very young children. These effects decrease image quality and thereby decrease the overall performance of the fingerprint sensor. In one recent study, 16% of fingerprint images were found to be of suboptimal image quality as a result of these effects. In some cases, commercial optical fingerprint readers incorporate a thin membrane of soft material such as silicone to help mitigate some of these effects and restore performance. As a soft material, the membrane is subject to damage, wear, and contamination, limiting the use of the sensor before it requires maintenance.

Biometric sensors, particularly fingerprint biometric sensors, are generally prone to being defeated by various forms of spoof samples. In the case of fingerprint readers, a variety of methods are known in the art for presenting readers with a fingerprint pattern of an authorized user that is embedded in some kind of inanimate material such as paper, gelatin, epoxy, latex, or the like. Thus, even if a fingerprint reader can be considered to reliably determine the presence or absence of a matching fingerprint pattern, it is also critical to the overall system security to ensure that the matching pattern is being acquired from a genuine, living finger, which is difficult to ascertain with many existing sensors.

There is accordingly a general need in the art for improved biometric sensing techniques resistant to spoofing.

BRIEF SUMMARY OF THE INVENTION

Embodiments of the invention accordingly provide methods of evaluating the genuineness of a sample presented for biometric evaluation. The sample is illuminated under a plurality of distinct optical conditions. Light scattered from the sample is received. A plurality of images are formed, each such image being formed from the received light for a respective one of the plurality of distinct optical conditions. A plurality of texture measures is generated, each such texture measure being generated from a respective one of the plurality of images. It is determined whether the generated plurality of texture measures is consistent with the sample being authentic unconcealed biological tissue. The texture measure may comprise an image-contrast measure is certain specific embodiments.

Illumination of the sample under distinct optical conditions may be achieved by illuminating it with light having a plurality of different wavelengths, illuminating it with light under a plurality of distinct polarization conditions, illuminating it with light at a plurality of distinct illumination angles, and the like.

The texture measure may be generated in some embodiments by performing a spatial moving-window analysis of each of the plurality of images. In some instances, the plurality of texture measures may comprise a measure of image contrast within certain spatial frequencies. For example, when the sample is illuminated with light having a plurality of distinct wavelengths, it may be confirmed that an image contrast under red illumination is less than an image contrast under blue illumination. Alternatively, it may be confirmed that an image contrast under red illumination is less than a predetermined value. The spatial moving-window analysis may be performed in some instances by calculating moving-window Fourier transforms on the plurality of images. Alternatively, it may be performed by calculating a moving-window centrality and a moving-window variability measure of the plurality of images. For instance, in one embodiment, the moving-window centrality measure comprises a moving-window mean and the moving-window variability measure comprises a moving-window standard deviation. In another embodiment, the moving-window centrality measure comprises a moving-window mean and the moving-window variability measure comprises a moving-window range.

The determination of sample authenticity may be made by applying a multidimensional scaling to map the plurality of texture measures to a point in a multidimensional space. This permits a determination to be made whether the point is in a predefined region of the multidimensional space that corresponds to the sample being authentic unconcealed biological tissue. In one embodiment, the multidimensional space is a two-dimensional space.

BRIEF DESCRIPTION OF THE DRAWINGS

A further understanding of the nature and advantages of the present invention may be realized by reference to the remaining portions of the specification and the drawings wherein like reference labels are used through the several drawings to refer to similar components. In some instances, reference labels include a numerical portion followed by a latin-letter suffix; reference to only the numerical portion of reference labels is intended to refer collectively to all reference labels that have that numerical portion but different latin-letter suffices.

The patent or application file contains at least one drawing executed in color. Copies of this patent or patent application publication with color drawings will be provided by the Office upon request and payment of the necessary fee FIG. 1A provides a front view of a multispectral biometric sensor in one embodiment of the invention.

DETAILED DESCRIPTION OF THE INVENTION

Embodiments of the invention provides methods and systems that allow for the collection and processing of biometric measurements, and permit discrimination between real tissue and spoofs. The biometric measurements themselves, once authenticated as derived from real tissue, may provide strong assurance of a person's identity. The biometric measurements are generally collected as "multispectral" data, which refers herein to a set of images collected under a plurality of distinct optical conditions during a single illumination session. The different optical conditions may include differences in polarization conditions, differences in illumination angle, differences in imaging angle, differences in illumination wavelength, and the like. Skin sites applicable to the multispectral measurements described herein include all surfaces and all joints of the fingers and thumbs, the fingernails and nail beds, the palms, the backs of the hands, the wrists and forearms, the face, parts of the eye including the iris and the sclera, the ears, and all other external surfaces of the body. While the discussion below sometimes makes specific reference to "fingers" in providing examples of specific embodiments, it should be understood that these embodiments are merely exemplary and that other embodiments may use skin sites at other body parts.

Figure 1A:
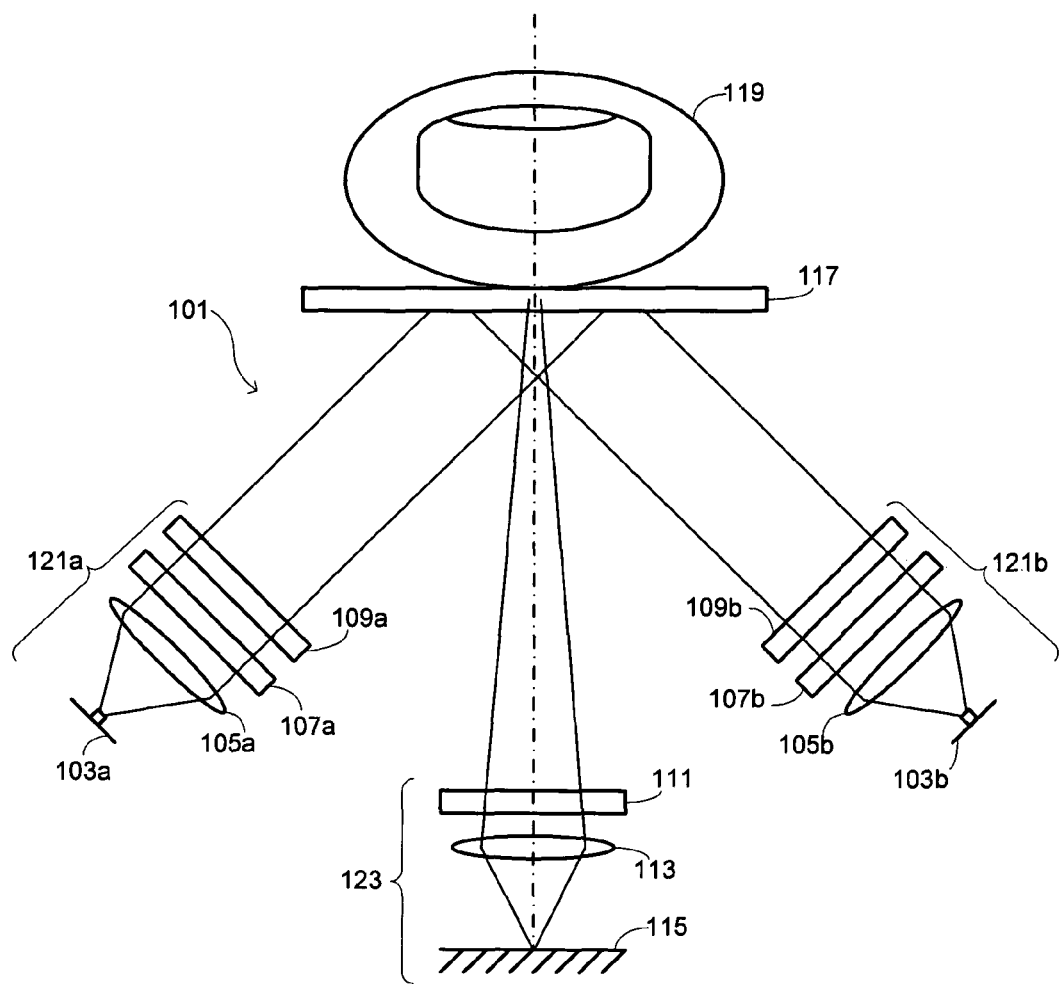
FIG. 1B provides a view of a multispectral biometric sensor in another embodiment of the invention.

One exemplary structure of a biometric sensor that may be used to collect multispectral data in accordance with embodiments of the invention is shown schematically in FIG. 1A. This structure is merely exemplary since many other configurations may be used to collect multispectral data that may be used to detect spoofing, several examples of which are illustrated and discussed in the related applications.

FIG. 1A shows a front view of a multispectral biometric sensor 101. The multispectral sensor 101 comprises an illumination subsystem 121 having one or more light sources 103 and a detection subsystem 123 with an imager 115. The figure depicts an embodiment in which the illumination subsystem 121 comprises a plurality of illumination subsystems 121a and 121b, but the invention is not limited by the number of illumination or detection subsystems 121 or 123. For example, the number of illumination subsystems 121 may conveniently be selected to achieve certain levels of illumination, to meet packaging requirements, and to meet other structural constraints of the multispectral biometric sensor 101. Illumination light passes from the source 103 through illumination optics 105 that shape the illumination to a desired form, such as in the form of flood light, light lines, light points, and the like. The illumination optics 105 are shown for convenience as consisting of a lens but may more generally include any combination of one or more lenses, one or more mirrors, and/or other optical elements. The illumination optics 105 may also comprise a scanner mechanism (not shown) to scan the illumination light in a specified one-dimensional or two-dimensional pattern. The light source 103 may comprise a point source, a line source, an area source, or may comprise a series of such sources in different embodiments. In one embodiment, the illumination light is provided as polarized light, such as by disposing a linear polarizer 107 through which the light passes before striking a finger 119 or other skin site of the person being studied.

In some instances, the light source 103 may comprise one or more quasimonochromatic sources in which the light is provided over a narrow wavelength band. Such quasimonochromatic sources may include such devices as light-emitting diodes, laser diodes, or quantum-dot lasers. Alternatively, the light source 103 may comprise a broadband source such as in incandescent bulb or glow bar. In the case of a broadband source, the illumination light may pass through a bandpass filter 109 to narrow the spectral width of the illumination light. In one embodiment, the bandpass filter 109 comprises one or more discrete optical bandpass filters. In another embodiment, the bandpass filter 109 comprises a continuously variable filter that moves rotationally or linearly (or with a combination of rotational and linear movement) to change the wavelength of illumination light. In still another embodiment, the bandpass filter 109 comprises a tunable filter element such as a liquid-crystal tunable filter, an acousto-optical tunable filter, a tunable Fabry-Perot filter or other filter mechanism known to one knowledgeable in the art.

After the light from the light source 103 passes through the illumination optics 105, and optionally the optical filter 109 and/or polarizer 107, it passes through a platen 117 and illuminates the finger 119 or other skin site. There are a variety of different ways in which the sensor layout and components may be selected to direct light into the detection optics 113, with some such arrangements being particularly suitable to enhance spoof-detection capabilities. For example, a variety of polarization configurations may be employed advantageously to make the optical measurement more sensitive to certain skin depths, using linear, elliptical, or circular polarizers in different embodiments. In the embodiment illustrated in FIG. 1A, the illumination light is polarized by linear polarizer 107. The detection subsystem 123 may then also include a linear polarizer 111 that is arranged with its optical axis substantially orthogonal to the illumination polarizer 107. In this way, light from the sample must undergo multiple scattering events to significantly change its state of polarization. Such events occur when the light penetrates the surface of the skin and is scattered back to the detection subsystem 123 after many scatter events. In addition to configurations that provide cross-polarized images, embodiments may advantageously collect images using parallel polarizers or random polarization. Each of these different configurations may provide texture information of the sample that is useful for spoof detection.

The detection subsystem 123 may incorporate detection optics that comprise lenses, mirrors, and/or other optical elements that form an image of the region near the platen surface 117 onto the detector 115. The detection optics 113 may also comprise a scanning mechanism (not shown) to relay portions of the platen region onto the detector 115 in sequence. In all cases, the detection subsystem 123 is configured to be sensitive to light that has penetrated the surface of the skin and undergone optical scattering within the skin and/or underlying tissue before exiting the skin. In one embodiment, the optical filter 109 is comprised by the detection subsystem 123. In particular, the optical filter 109 may comprise a color filter array with elements that pass different wavelength bands. For example, the color filter array may comprise red, green, and blue filters in a Bayer pattern or similar arrangement. In such an embodiment, the light source 103 may be chosen to have wavelengths contained within each of the three filter passbands to permit acquisition of data at three different wavelengths. This may be achieved by using a plurality of light sources having different wavelengths or by using a white-light or other broadband source that spans the wavelength range defined by the filter 109. The raw image (not color corrected) may then be subsampled in a manner consistent with the Bayer pattern to produce three subimages representing the red, green, and blue illumination conditions.

The illumination subsystem 121 and detection subsystem 123 may be configured to operate in a variety of optical regimes and at a variety of wavelengths. One embodiment uses light sources 103 that emit light substantially in the region of 400-1000 nm; in this case, the detector 115 may be based on silicon detector elements or other detector material known to those of skill in the art as sensitive to light at such wavelengths. In another embodiment, the light sources 103 may emit radiation at wavelengths that include the near-infrared regime of 1.0-2.5 µm, in which case the detector 115 may comprise elements made from InGaAs, InSb, PbS, MCT, and other materials known to those of skill in the art as sensitive to light at such wavelengths.

Figure 1B:
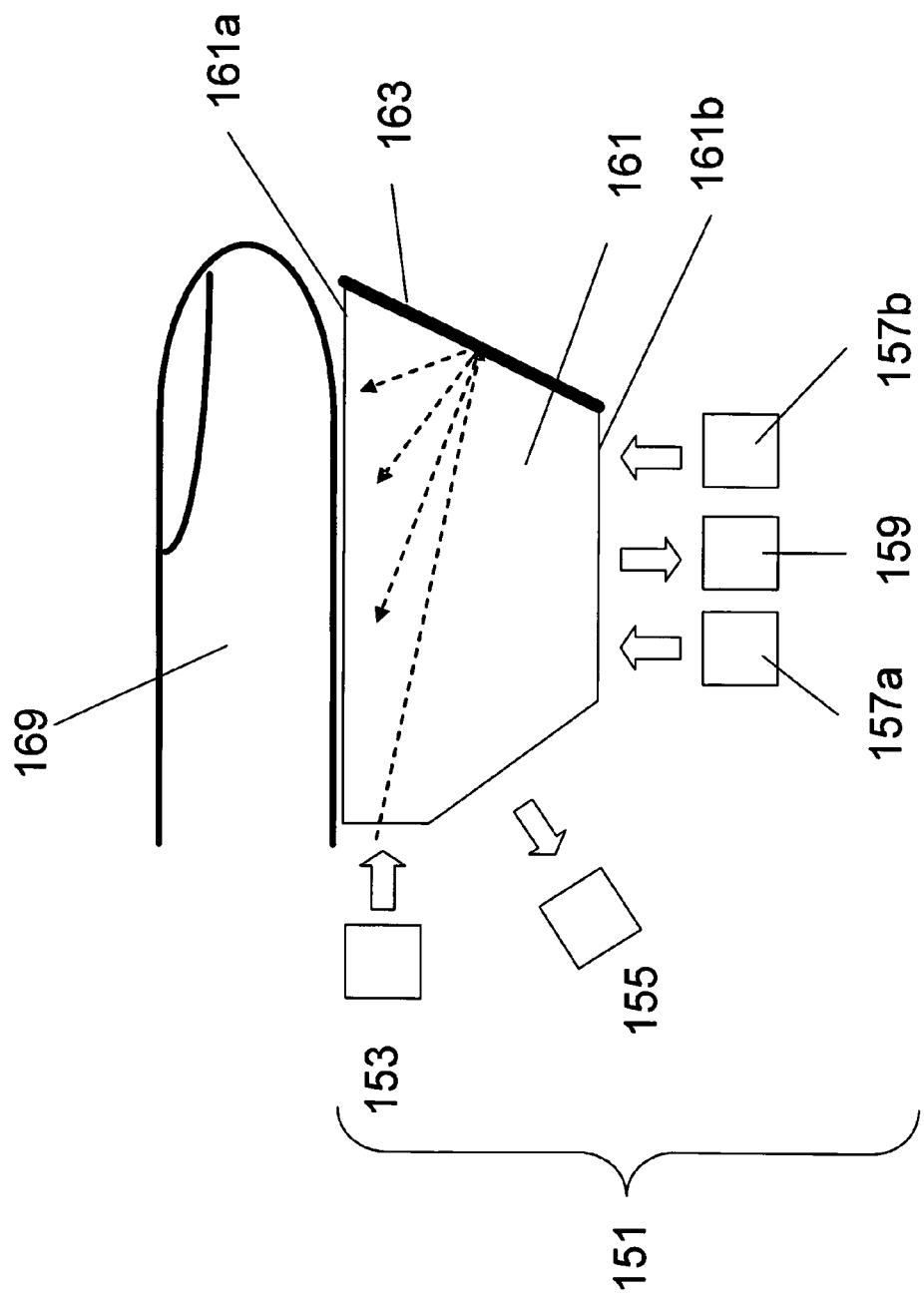

In some embodiments, the multispectral imaging enabled by the sensor described above may be integrated with a conventional TIR imaging system. One illustration of such an integration is provided in FIG. 1B, which shows a bright-field fingerprint sensor integrated with multispectral-analysis capability. The sensor comprises a light source 153, a platen 161, and an imaging system 155. The imaging system 165 may comprise lenses, mirrors, optical filters, a digital imaging array, and other such optical elements (not shown). The optical axis of the imaging system 155 is at an angle greater than the critical angle with respect to surface 161a. The light from the source 153 passes into the platen 161 and strikes a diffuse reflective coating 163, which broadly illuminates the platen surface 161a. In the absence of a finger 169, light undergoes TIR at surface 161a and a portion is collected and forms a uniformly bright TIR image by imaging system 155. When skin of proper index of refraction is in optical contact with the platen surface 161 a, the points of contact will form relatively dark regions on the resulting image. Variants of such a configuration, using different locations for the sources 153 and/or imaging systems 155, may achieve a dark-field TIR image. For example, if the platen 161 is illuminated with light source 157 and imaged by imaging system 155, a dark-field image is produced, wherein points of contact are relatively bright. In some dark-field embodiments, coating 163 may comprise an optical absorber.

A second imaging system 159 looks up at the finger 169 through facet 161b. Imaging system 159 has an optical axis less than the critical angle with respect to facet 161a. In some embodiments, imaging system 159 is oriented approximately normal to facet 161a. This imaging system may comprise lenses, mirrors, optical filters, and a digital imaging array (not shown). In this manner, when light source 153 is illuminated, a TIR image may be captured by camera 155 while a direct image may be captured by camera 159. Even in cases where the TIR image is adversely affected by water, dirt, lack of contact, dry skin, etc., the image captured by camera 159 is relatively unaffected and generally contains usable biometric features, including the fingerprint pattern.

Imaging system 159 may further incorporate an optical polarizer (not shown), which may be a linear polarizer or elliptical (e.g. circular) polarizer. As well, other light sources 157 may be added to the system. The light sources 157 may be incandescent sources such as quartz-tungsten-halogen lamps or others commonly known in the art. The sources 157 may be other broadband sources such as white-light LEDs or others known in the art. The sources may be quasimonochromatic sources such as solid-state LEDs, organic LEDs, laser diodes, or other kinds of lasers or quasimonochromatic sources known in the art. The sources 157 may further comprise lenses, mirrors, optical diffusers, optical filters, and other such optical elements.

The sources 157 may be substantially the same or may provide for different illumination wavelengths, angles, and/or polarization conditions. In the latter case, one of the sources 157a may have an optical polarizer (not shown) that is oriented substantially orthogonal to the polarizer incorporated in the imaging system 159. Such an optical geometry tends to emphasize features of the skin that lie below the surface. One of the light sources 157b may incorporate a polarizer that is substantially parallel to the polarizer used in imaging system 159, which will tend to emphasize surface features of the skin. Alternatively, one of the light sources 157b may omit the polarizer, producing random polarization. Such random polarization may be described as a combination of polarization parallel and perpendicular to the polarizer in the imaging system 159, producing an image that combines features from the two polarization conditions. The light sources 157 may be of the same wavelength or of different wavelengths (with or without polarizers). The number and arrangement of sources 157 may be different for different embodiments to accommodate form-factor constraints, illumination-level constraints, and other product requirements.

In one embodiment, the sources 157 are oriented at an angle less than the critical angle with respect to facet 161a. In a preferred embodiment, sources may be located at such an angle and position that no direct reflection of the source is seen by imaging system 159 or 155. Such direct reflections can also be greatly mitigated through the use of crossed-polarizer configurations, but some image artifacts will still be generally present if the sources are in the field of view. Moreover, parallel-polarized and nonpolarized configurations are very susceptible to such back reflections.

Attempts to spoof such a system may generally be characterized according to three different classes: (1) use of a thin transparent film overlying the finger or other tissue; (2) use of a thin scattering film overlying the finger or other tissue; and (3) use of a thick sample overlying the finger or other tissue. Embodiments of the invention are of greater utility in the second and third instances, i.e. when the spoof comprises a thick film or a thin scattering film. In instances where the spoof comprises a thin transparent film, i.e. is substantially nonabsorbing and nonscattering, an attempt to incorporate a topology of a different fingerprint pattern may be detected by comparing conventional and TIR patterns; a more detailed description of how to perform such comparisons is provided in U.S. patent application Ser. No. 11/015,732, which has been incorporated herein by reference.

A spoof that uses a thin scattering film, i.e. a substantially nonabsorbing film with a significant amount of optical scattering, may also incorporate a topology of a different fingerprint pattern in an attempt to fool a conventional sensor. The spectral imaging described herein permits properties of the underlying tissue to be imaged even while the image of the real fingerprint is obscured. Conversely, a thick sample provides a combination of sample scattering and absorbance properties that ensure that detected light does not penetrate significantly into the adjacent tissue, if at all. An attempt to incorporate a topology of a different fingerprint pattern to fool a conventional sensor may be detected in accordance with embodiments of the invention by evaluating the spectral and other optical properties of the thick sample and comparing them to those of real tissue.

Embodiments of the invention make use of a recognition by the inventor that relationship of certain characteristics of a sample image collected under multispectral conditions are generally similar for living human skin but different between skin and other materials. A comparison of two or more images taken under different optical conditions thus provides a mechanism for spoof detection. In particular, certain measures of texture of the images may be made and compared to perform the spoof detection. As used herein, "texture measure" refers to any of a large number of metrics that describe some aspect of a spatial distribution of tonal characteristics of an image. For example, some textures, such as those commonly found in fingerprint patterns or wood grain, are flow-like and may be well described by metrics such as an orientation and coherence. For textures that have a spatial regularity (at least locally), certain characteristics of the Fourier transform and the associated power spectrum are important such as energy compactness, dominant frequencies and orientations, etc. Certain statistical moments such as mean, variance, skew, and kurtosis may be used to describe texture. Moment invariants may be used, which are combinations of various moments that are invariant to changes in scale, rotation, and other perturbations. Gray-tone spatial dependence matrices may be generated and analyzed to describe image texture. The entropy over an image region may be calculated as a measure of image texture. These and other such measures of texture known to one familiar in the art may be used individually or in combination in embodiments of the invention.

As an example of one of the embodiments of the present invention, the multispectral conditions may comprise a plurality of different wavelengths of illumination light. The texture measure may be a measure of image contrast generated for certain spatial frequencies of the image. "Image contrast" refers herein to a measure of the tonal variation relative to the average tonal value over some region of an image. In the case of a living, uncovered human finger imaged using visible wavelengths by methods similar to those described herein, a significant portion of the fingerprint signal is due to capillary blood. This is due, in part, to the known physiological characteristic that the capillaries in the finger follow the pattern of the external fingerprint ridge structure. Therefore, the contrast of the fingerprint features relative to the illumination wavelength may be expected to be related to the spectral features of blood. In particular, the contrast of images taken with wavelengths longer than about 580 nm are significantly reduced relative to those images taken with wavelengths less than about 580 nm. Fingerprint patterns generated with non-blood pigments and other optical effects such as Fresnel reflectance have a different spectral contrast.

Figure 2:
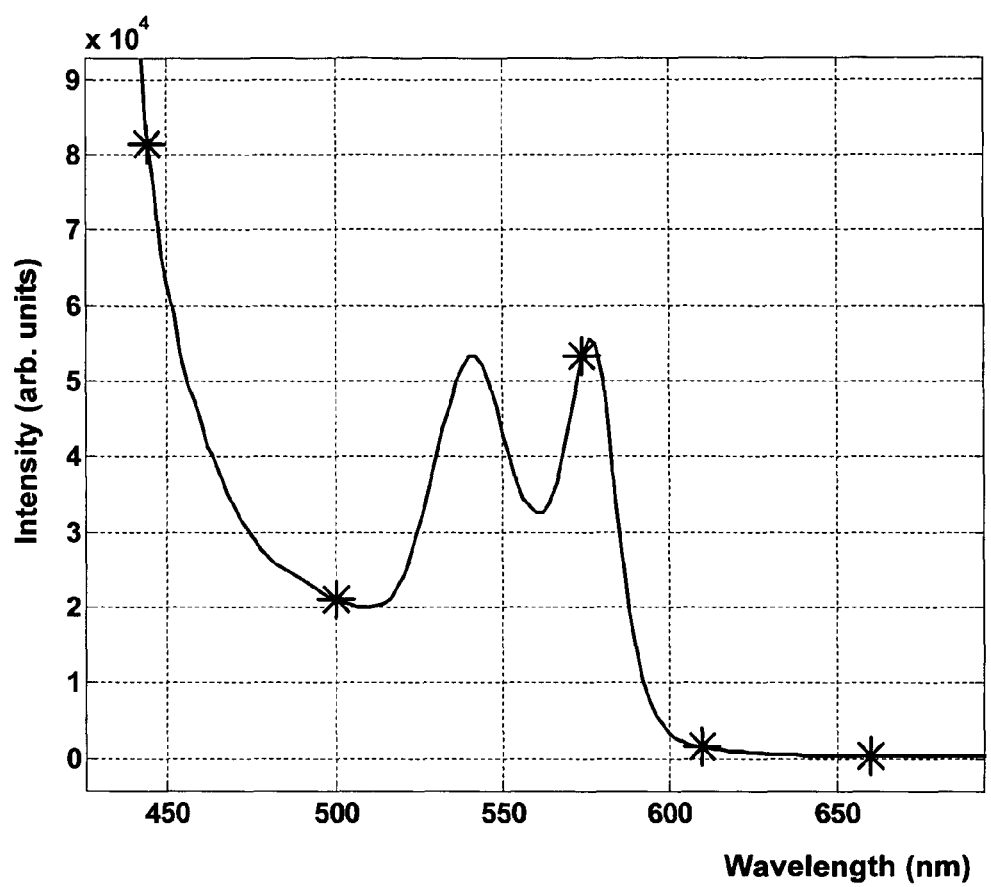
FIG. 2 is a graph of an oxygenated-blood absorbance spectrum.

These absorbance spectrum of oxygenated blood over a wavelength range from about 425 nm to about 700 nm is shown in FIG. 2. In an exemplary embodiment, five different wavelengths are used to define the multispectral conditions, in this instance 445 nm, 500 nm, 574 nm, 610 nm, and 660 nm, although the invention is not limited to the use of any particular wavelengths or number of multispectral conditions used. Each of these wavelengths is identified in the spectrum of FIG. 2. As seen in the figure, the absorbance values of blood are largest for the exemplary wavelengths of 445 nm and 574 nm, less for 500 nm, and are very small for 610 nm and 660 nm. Therefore, images taken of an authentic finger under 445 nm and 574 nm illumination wavelengths may be expected to provide relatively high contrast and that images taken at 610-nm and 660-nm wavelengths provide relatively low contrast, with images taken at 500 nm having intermediate contrast. It is anticipated that the effects from other absorbers such as melanin, changes in scatter per wavelength, and various chromatic aberrations also affect the measures of contrast and/or other texture measures, but these effects are either small or also characteristic of a living human finger relative to other potential spoofing materials and methods.

Figure 3:
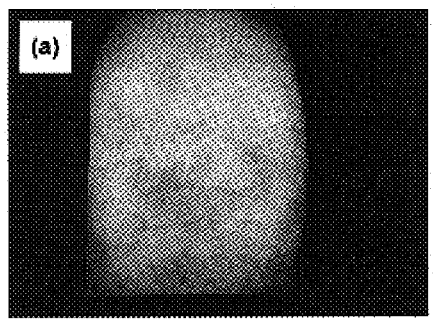
FIG. 3 (COLOR) provides images taken under different illumination conditions of real fingers and of spoofs.
Figure 3:
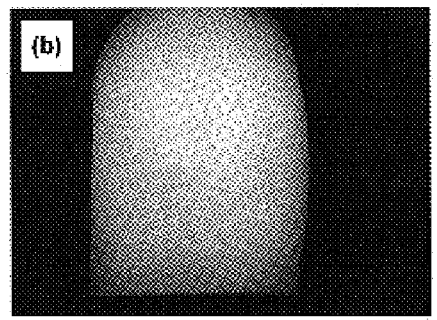
Figure 3:
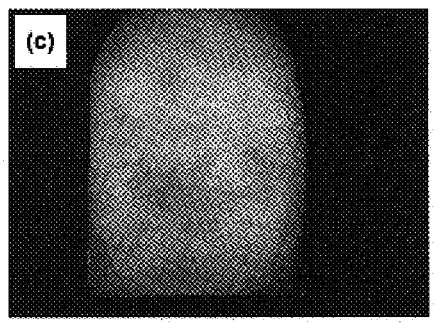
Figure 3:
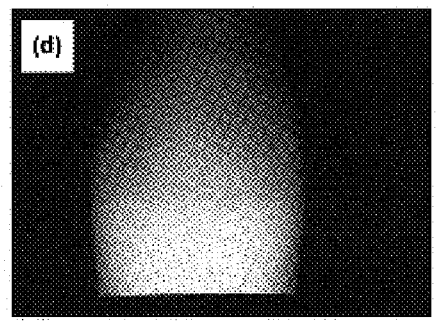
Figure 3:
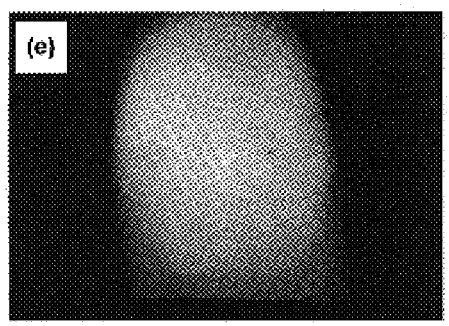
Figure 3:
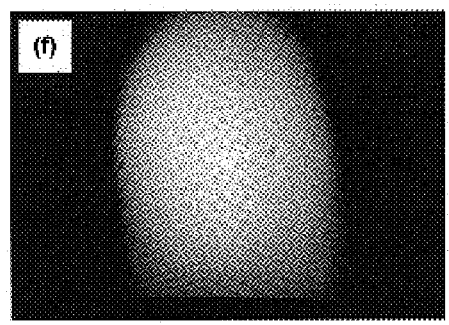
Figure 3:
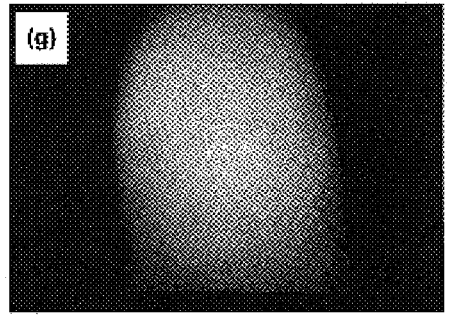
Figure 3:
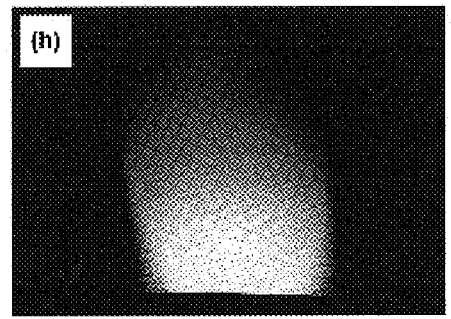

The various embodiments have been tested on data sets using twenty normal-finger images collected across thirteen people and using ten spoof images collected with thin silicone spoofs. Examples of images that may be collected are shown in FIG. 3, with parts (a)-(d) of that drawing showing results for real fingers and parts (e)-(h) showing results for spoofs. The "planes" identified for each of the images correspond to the different wavelengths, i.e. plane 1 is at 445 nm, plane 2 is at 500 nm, plane 3 is at 574 nm, plane 4 is at 610 nm, and plane 5 is at 660 nm. The origin of plane 6 can be understood with reference to FIG. 1B. Plane 6 corresponds to an image collected using the TIR illumination 153 but imaged by imaging system 159. The wavelength of the TIR illumination used in this experiment was approximately 640 nm. A comparison of the images may thus be made between real-finger-spoof pairs, i.e. between parts (a) and (e), which both show results for planes [3 2 1], where the notation [3 2 1] means that plane 3 has been mapped to red values in the color figure, plane 2 has been mapped to green values, and plane 1 has been mapped to blue values. Similarly, a comparison may be made between parts (b) and (f), which both show results for planes [5 4 5]; between parts (c) and (g), which both show results for planes [5 3 1]; and between parts (d) and (h), which both show TIR-illumination results. The [3 2 1] images of parts (a) and (e) are taken with blue and green illumination and show that for both the real tissue and the spoofs that the fingerprint ridges are relatively high contrast. This is opposite to the result for the [5 4 5] images of parts (b) and (f), which were taken under red illumination and show relatively low contrast for the fingerprint ridges of the real finger but relatively high contrast for the fingerprint ridges of the spoof.

Figure 4:
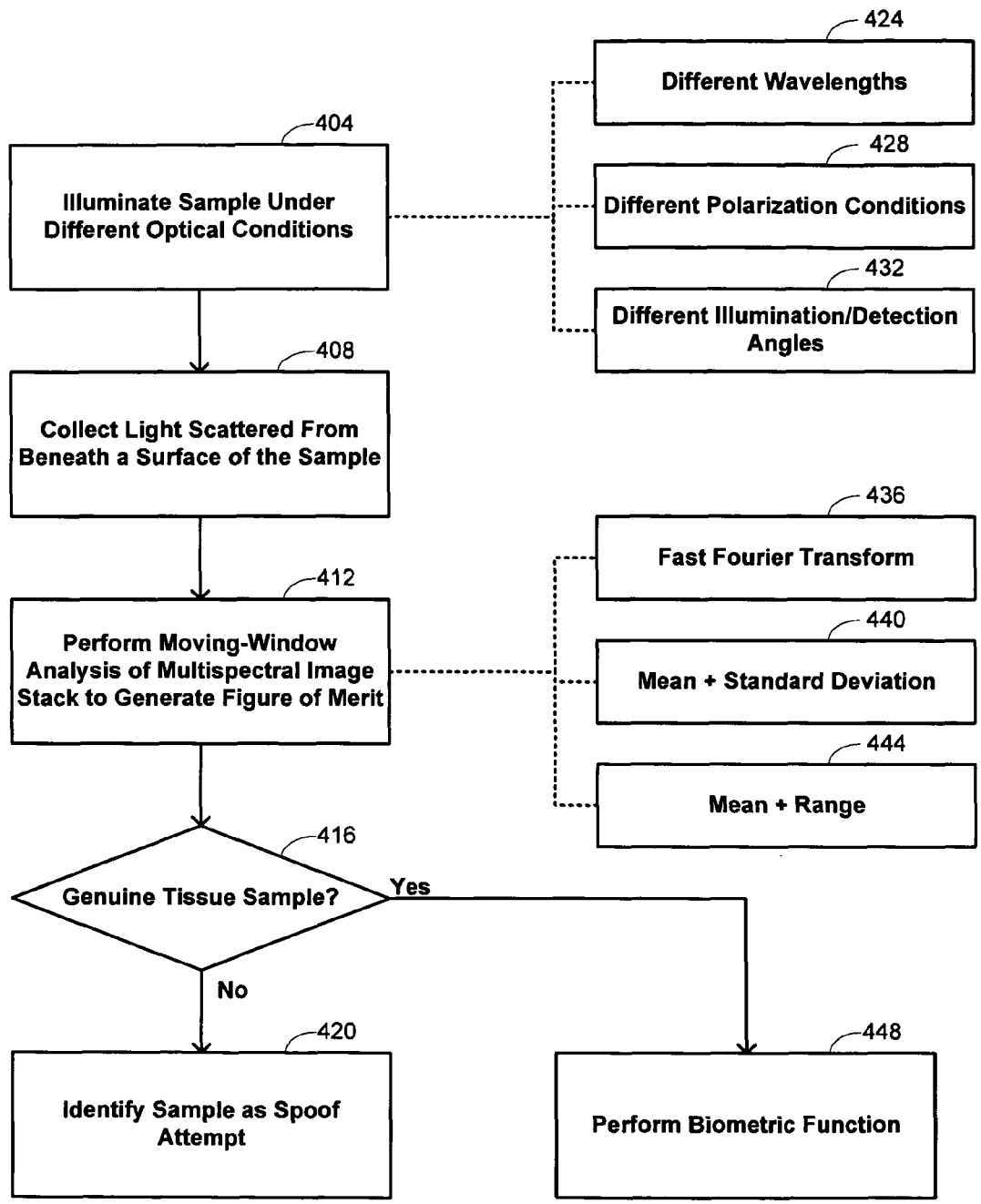
FIG. 4 is a flow diagram summarizing certain methods of the invention.

Exploiting such differences is achieved with methods of the invention, which are summarized with the flow diagram of FIG. 4. One or more measures of texture are developed for each optical condition, and the resulting set of texture measures is compared with the expected values from an authentic sample. At block 404, a sample purported to be a tissue sample presented to enable a biometric function is illuminated under different optical conditions. Examples of the different optical conditions may include such factors as different wavelengths as indicated at block 424, different polarization conditions as indicated at block 428, different light-interaction angles as indicated at block 432, and the like. Light scattered from the sample is collected at block 408 and used in the comparative texture analyses. Different embodiments make use of a different form of moving-window analysis of the multispectral image stack derived from the collected light to generate a figure of merit at block 412, and thereby evaluate the measure of texture or figure of merit. In some embodiments, the moving window operation 412 may be replaced with a block-by-block or tiled analysis. In some embodiments, a single region of the image or the whole image may be analyzed at one time. The drawing shows three examples of contrast figures of merit that may be used in different embodiments, but this specific identification is not intended to be limiting since other contrast figures of merit as well as other texture measures may be used in alternative embodiments, as will be evident to those of skill in the art after reading this disclosure.

In one embodiment, fast-Fourier transforms are performed on the multispectral image stack as indicated at block 436. An in-band contrast figure of merit C is generated in such embodiments as the ratio of the average or DC power to in-band power. Specifically, for optical condition i, the contrast figure of merit is $$C_i \equiv \frac{\sum_\xi \sum_\eta |F_i(\xi, \eta)|^2 \bigg|_{R_{low}^2 < (\xi^2 + \eta^2) < R_{high}^2}}{|F_i(0, 0)|^2}.$$

In this expression, $F_i(\xi, \eta)$ is the Fourier transform of the image $f_i(x, y)$ taken under illumination condition i, where x and y are spatial coordinates for the image. The range defined by $R_{low}$ and $R_{high}$ represents a limit on spatial frequencies of interest for fingerprint features. For example, $R_{low}$ may be approximately 1.5 fringes/mm in one embodiment and $R_{high}$ may be 3.0 fringes/mm. In embodiments where the multispectral conditions are defined entirely by different illumination wavelengths, each state i represents one of those illumination wavelengths λ. In an alternative formulation, the contrast figure of merit may be defined as the ratio of the integrated power in two different spatial frequency bands. The equation shown above is a specific case where one of the bands comprises only the DC spatial frequency.

In another embodiment, moving-window means and moving-window standard deviations are calculated for the multispectral stack and used to generate the figure of merit, as indicated at block 440. In this embodiment, for each optical condition i, the moving-window mean $\mu_I$ and the moving-window standard deviation $\sigma_I$ are calculated from the collected image $f_i(x, y)$. The moving windows for each calculation may be the same size and may conveniently be chosen to span on the order of 2-3 fingerprint ridges. Preferably, the window size is sufficiently large to remove the fingerprint features but sufficiently small to have background variations persist. The figure of merit $C_i$ in this embodiment is calculated as the ratio of the moving-window standard deviation to the moving-window mean:

$$C_i = \frac{\sigma_i}{\mu_i}.$$

In still another embodiment, a similar process is performed but a moving-window range (i.e., max(image values)—min(image values)) is used instead of a moving-window standard deviation. This is indicated generally at block 444. Thus, similar to the previous embodiment, a moving-window mean $\mu_I$ and a moving-window range $\delta_I$ are calculated from the collected image $f_i(x, y)$ for each optical condition i. The window size for calculation of the moving-window mean is again preferably large enough to remove the fingerprint features by small enough to maintain background variations. In some instances, the window size for calculation of the moving-window mean is the same as for calculation of the moving-window range, a suitable value in one embodiment spanning on the order of 2-3 fingerprint ridges. The figure of merit in this embodiment is calculated as the ratio of the moving-window mean:

$$C_i = \frac{\delta_i}{\mu_i}.$$

This embodiment and the preceding one may be considered to be specific cases of a more general embodiment in which moving-window calculations are performed on the multispectral stack to calculate a moving-window centrality measure and a moving-window variability measure. The specific embodiments illustrate cases in which the centrality measure comprises an unweighted mean, but may more generally comprise any other type of statistical centrality measure such as a weighted mean or median in certain embodiments. Similarly, the specific embodiments illustrate cases in which the variability measure comprises a standard deviation or a range, but may more generally comprise any other type of statistical variability measure such as a median absolute deviation or standard error of the mean in certain embodiments.

The results of the moving-window analysis are evaluated at block 416 to determine whether they are consistent with the sample being a genuine tissue sample. If so, the biometric function may be performed at block 448, usually including a further analysis to identify, or verify the identity of, the person to whom the tissue belongs. If the results are inconsistent with the sample being a genuine tissue sample, it is identified as a spoof at block 420. Classification methods such as linear discriminant analysis, quadratic discriminant analysis, K nearest neighbors, support vector machines, decision trees, and other such methods as known to one of skill in the art may be employed to perform such identification.

Figure 5A:
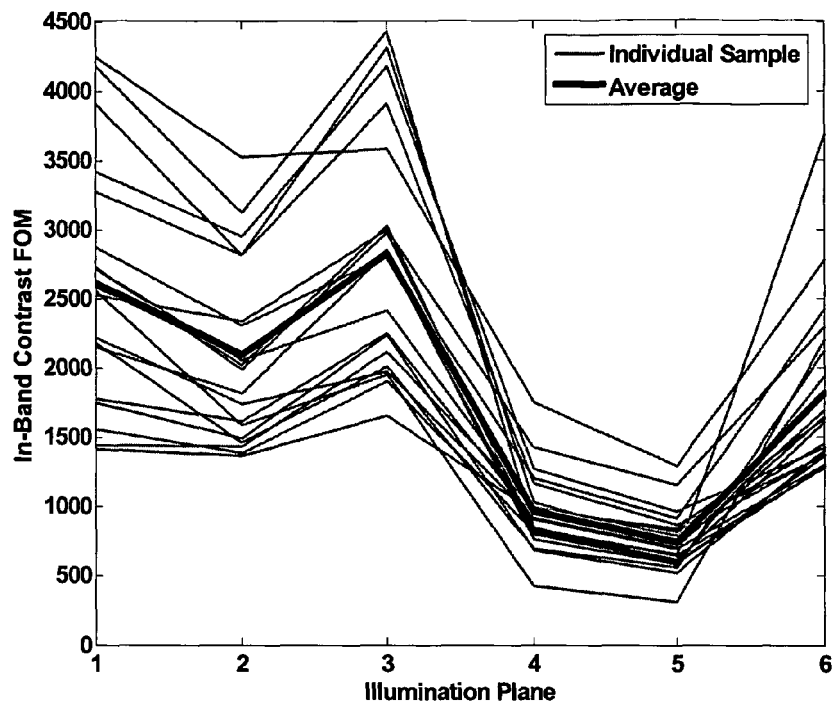
FIG. 5A provides a plot of results collected in a first embodiment of the invention.
Figure 5B:
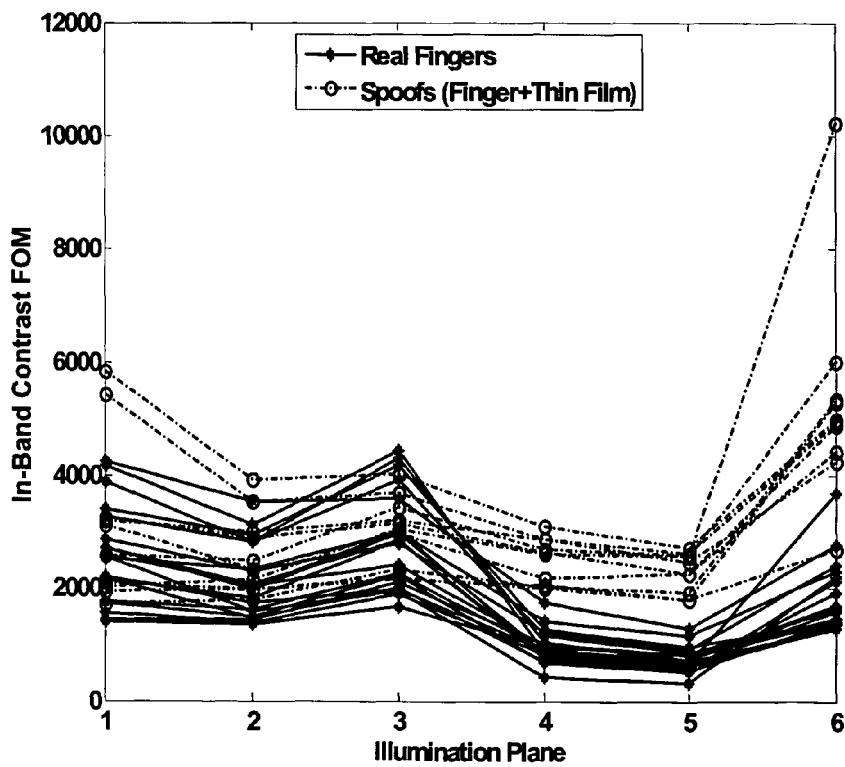
FIG. 5B provides results comparing the data of FIG. 5A for real fingers and spoofs.
Figure 5C:
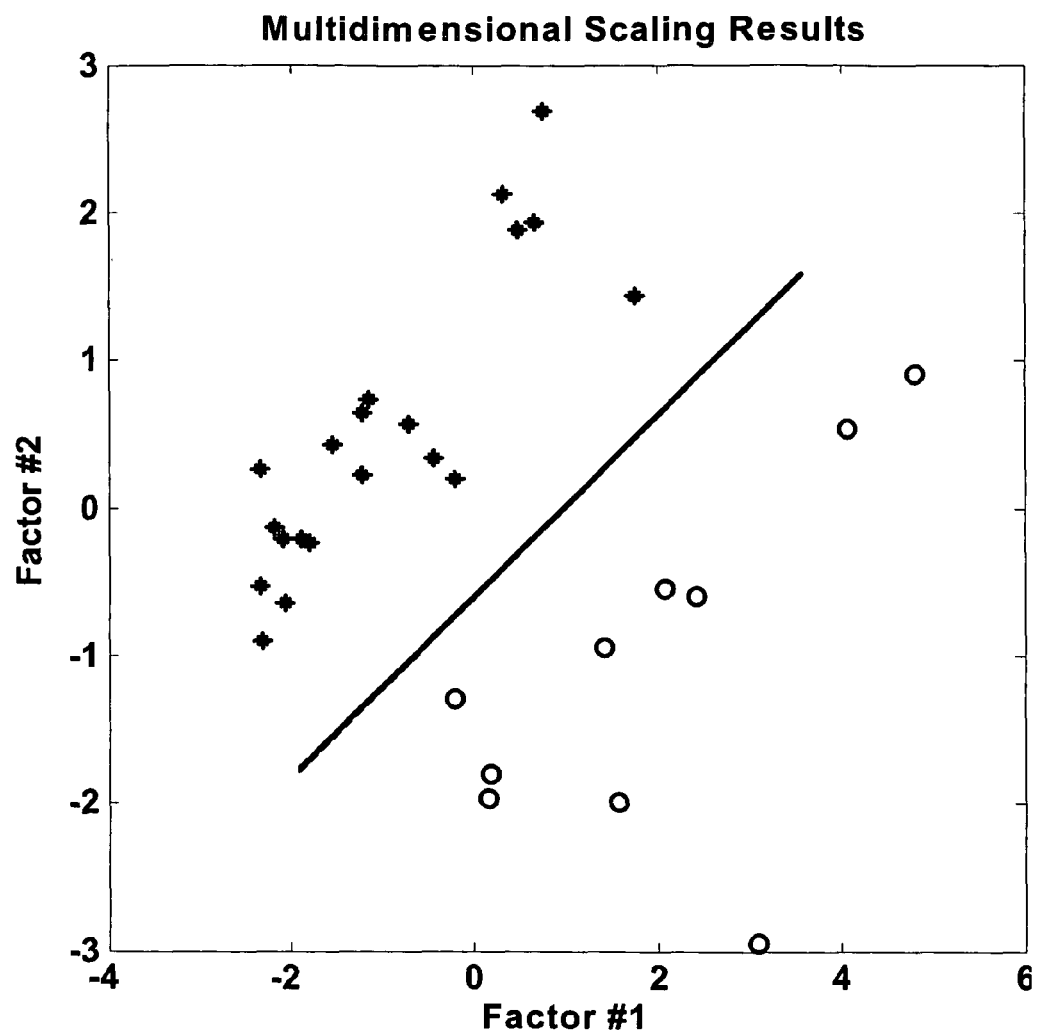
FIG. 5C is a separability plot resulting from multidimensional scaling of the data of FIG. 5A.
Figure 6A:
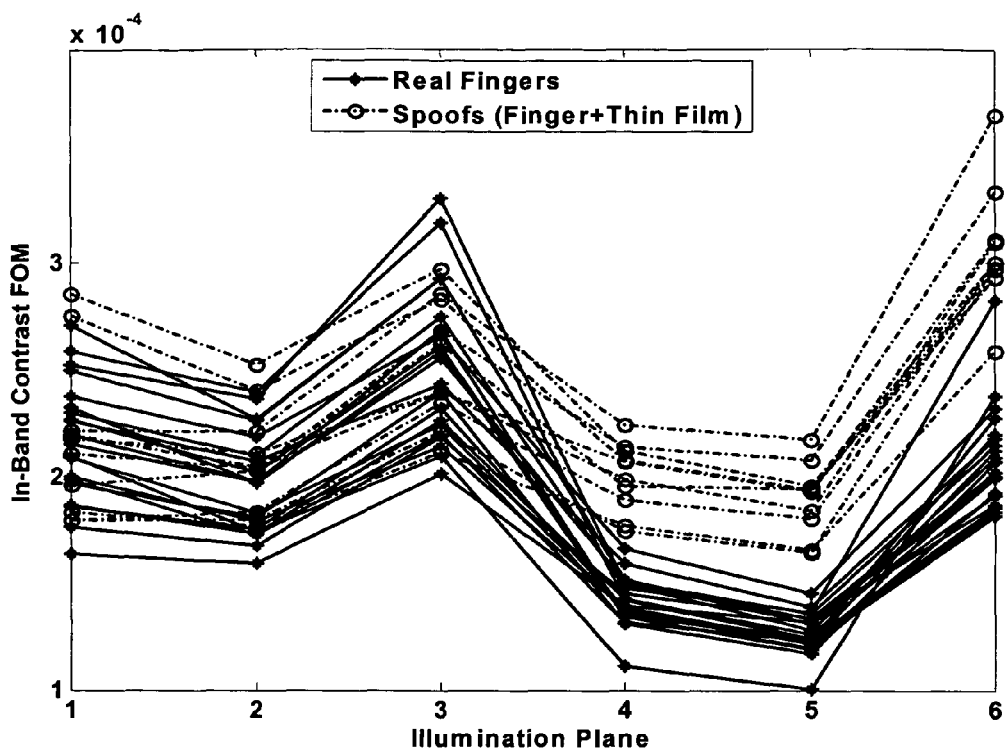
FIG. 6A provides a comparison of results collected in a second embodiment of the invention between real fingers and spoofs.
Figure 6B:
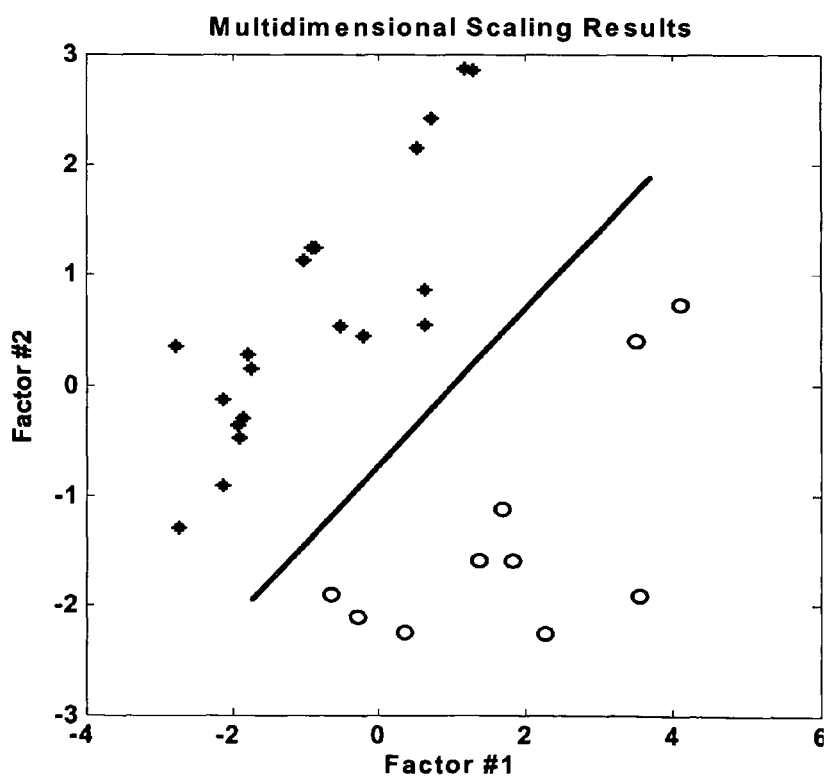
FIG. 6B is a separability plot resulting from multidimensional scaling of the data of FIG. 6A.
Figure 7A:
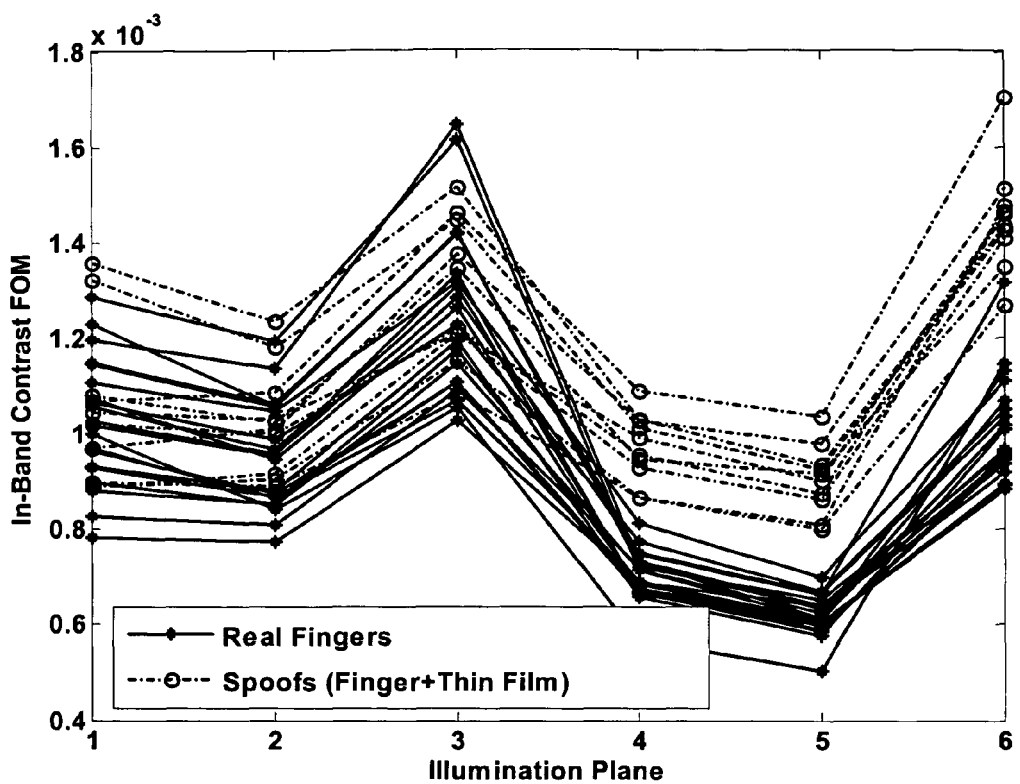
FIG. 7A provides a comparison of results collected in a third embodiment of the invention between real fingers and spoofs.
Figure 7B:
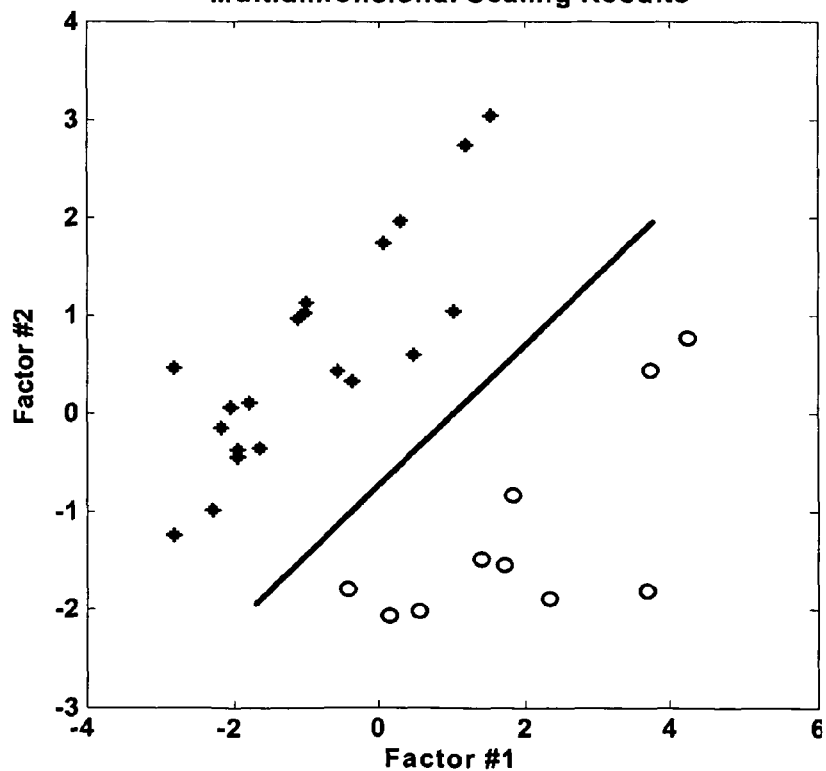
FIG. 7B is a separability plot resulting from multidimensional scaling of the data of FIG. 7A.

Exemplary results for each of the methods described above are provided in FIGS. 5A-7B. FIGS. 5A-5C provide results in which the figure of measure is calculated from moving-window fast Fourier transforms; FIGS. 6A and 6B provide results in which the figure of measure is calculated from a moving-window mean and a moving-window standard deviation; and FIGS. 7A and 7B provide results in which the figure of measure is calculated from a moving-window mean and a moving-window range.

The results shown in FIG. 5A were collected for real fingers and show results for the in-band contrast figure of merit derived from the moving-window fast Fourier transforms for each of multiple samples. The results for each sample are plotted along an abscissa identifying the illumination planes specified above; the abscissa may thus be considered to illustrate a wavelength dependence although the illumination plane numbers correspond somewhat nonlinearly to the wavelength. The data for individual samples are joined with gray lines and an average over all of the samples is shown with the thicker black line. Most of the results from real-finger samples show a characteristic and expected "V" shape in the blue-green region of the spectrum (planes 1-3) with a marked decrease of contrast at red wavelengths of planes 4-5, as expected due to the blood absorbance characteristics illustrated in FIG. 2. The contrast values for plane 6 are not consistent with the other planes due to the different optical geometry used to collect these images, but the values from this plane do provide additional discrimination ability.

Results for both real fingers and for spoofs are shown in FIG. 5B. In this instance, the results for the real fingers are shown with diamonds connected by solid lines while the results for the spoofs are shown with circles connected by dotted lines. The spoofs were real fingers covered by a thin film. As evident from an examination of the results at illumination planes 4, 5, and 6, the spoofs show higher contrast under red illumination than is anticipated for a genuine sample. In some instances, a relative comparison of the contrast figures of merit may be more robust than an absolute determination, such as by evaluating whether the red contrast values are less than some factor $\alpha$ of the blue-green values. Different embodiments may use different values of $\alpha$, with suitable values expected to be about $\alpha=0.5$, $\alpha=0.75$, etc.

Multidimensional scaling may be used to process the data to provide a clear quantitative discriminator between real tissue and spoofs. This is illustrated in FIG. 5C, which shows multidimensional scaling results plotted for two coordinates. The coordinates in this instance correspond to scores of eigenvectors derived from a principal component analysis ("PCA") of the contrast data; specifically, "Factor 1" and "Factor 2" in this illustration are the scores for the first two eigenvectors generated from the data by the MatLab® program, available from The Mathworks, a company headquartered in Natick, Mass. The derived results for the real fingers are shown with asterisks, while circles are used to denote the derived results for the spoofs. A clear division is evident between the two, permitting the results of FIG. 5C to be used as a separability plot—the line drawn in the graph is one potential demarcating line. An unknown sample analyzed in the same way that generates a result above and to the left of the line may be identified as a genuine sample at block 416 of FIG. 4, while a result below and to the right of the line may be identified as a spoof. While the results here are shown for a two-dimensional space with different regions corresponding to different characterizations of the sample, more generally different regions of a space of any dimensionality may be used to discriminate the sample, such as by having hyperplanes demarcating the separation. More generally, as described elsewhere in this disclosure, a variety of different classification methods may be employed to classify the sample as an authentic finger or not.

The results of FIG. 6A are similar to those of FIG. 5B but were derived in an embodiment that uses a moving-window mean and a moving-window standard deviation as described above. Results from real fingers are again denoted with diamonds connected by solid lines while the results from spoofs are denoted with circles connected by dashed lines. Like the results of FIG. 5B, the spoofs show higher contrast under red illumination than a genuine sample. A similar separability plot to that of FIG. 5C is shown in FIG. 6B, derived using the results of FIG. 6A. In this instance, the results for real fingers are again denoted by asterisks while circles are used to denote the results for spoofs, and the results were again derived as eigenvector scores from a PCA, specifically using the first two eigenvectors provided by the MatLab® program. A demarcation line is shown that permits spoofs to be discriminated from real tissue by which portion of the two-dimensional space the multidimensional scaling results fall into. The general behavior shown in FIG. 6B is similar to that shown in FIG. 5C.

The results presented in FIGS. 7A and 7B also correspond to those of FIGS. 5B and 5C or of FIGS. 6A and 6B. In this instance, the results were derived in an embodiment that uses a moving-window mean and a moving-window range of the multispectral stack as described above. The spoof results denoted with circles connected by dashed lines again show higher contrast under red illumination that do the genuine-sample results denoted with diamonds connected by solid lines in FIG. 7A. The separability plot of FIG. 7B again shows the ability to define a demarcation line that separates the space of eigenvector scores into a region where real-tissue results (asterisks) are clearly separated from spoof results (circles). As previously noted, such a demarcation capability permits unknown results to the classified at block 416 of FIG. 4 according to which portion of the multidimensional space the derived results fall.

Various alternative methods may also be used in different embodiments to evaluate the contrast data as shown in such drawings as FIGS. 5A, 6A, and 7A. For example, linear discriminant analysis ("LDA") is used in one such alternative embodiments as a discriminator for contrast. Merely by way of example, such analysis may make use of training with two classes, a first class of contrast curves generated with human tissue and a second class of contrast curves generated with a variety of spoof samples.

While the various examples provided above focus on the use of fingers to provide tissue and on the use of different illumination-light wavelengths to provide multispectral conditions, this is not indented to be limited. In other embodiments, different polarization conditions may alternatively or additionally be used in defining the multispectral conditions. For example, comparisons may be mode between two or more conditions of polarization, which may include cross-polarized imaging, parallel-polarized imaging, random-polarized imaging, and the like. In addition, the incident light may have different polarization states, such as by having linearly polarized light, circularly polarized light, elliptically polarized light, or the like. In still other instances, different illumination angles may be used to provide multispectral conditions. The penetration depth of the light varies as a function of the illumination angle, resulting in changes in image contrast that may be analyzed as described above in discriminating between real tissue and spoofs.

Furthermore, the invention is not limited to the specific figures of merit described above and different or additional texture-based figures of merit may be used alternatively or additionally in various embodiments. For instance, statistical moments may be used, as may moment invariants, gray-level spatial dependencies, and the like in deriving figures of merit that discriminate samples as described.

Spectral contrast is a relative metric. An advantageous consequence of this fact is that the methods described above are expected to be robust across a variety of different types of spectral sensors and in a variety of different environmental conditions.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of evaluating genuineness of a sample presented for biometric evaluation, the method comprising:
    illuminating with illumination optics the sample with light having a plurality of different wavelengths;
    receiving via detection optics light scattered from the sample for each of the plurality of distinct optical conditions;
    forming a plurality of images, each such image being formed from the received light for a respective one of the plurality of distinct optical conditions; and
    analyzing the plurality of images using a computational device, wherein the analyzing comprises:
        generating a plurality of texture measures, each such texture measure being generated from a respective one of the plurality of images; and
        determining whether the generated plurality of texture measures is consistent with the sample being authentic unconcealed biological tissue.

2. The method recited in claim 1 wherein the texture measure comprises an image-contrast measure.

3. The method recited in claim 1 wherein illuminating the sample with light having a plurality of different wavelengths further comprises illuminating the sample with light under a plurality of distinct polarization conditions.

4. The method recited in claim 1 wherein illuminating the sample with light having a plurality of different wavelengths further comprises illuminating the sample with light at a plurality of distinct illumination angles.

5. The method recited in claim 1 wherein generating the plurality of texture measures comprises performing a spatial moving-window analysis of each of the plurality of images.

6. The method recited in claim 5 wherein each of the plurality of texture measures comprises a measure of image contrast within certain spatial frequencies.

7. The method recited in claim 5 wherein:
    determining-whether the generated plurality of texture measures is consistent with the sample being unconcealed biological tissue comprises confirming that an image contrast under red illumination is less than an image contrast under blue illumination.

8. The method recited in claim 5 wherein:
    determining whether the generated plurality of texture measures is consistent with the sample being unconcealed biological tissue comprises confirming that an image contrast under red illumination is less than a predetermined value.

9. The method recited in claim 5 wherein performing the spatial moving-window analysis comprises calculating moving-window Fourier transforms on the plurality of images.

10. The method recited in claim 5 wherein performing the spatial moving-window analysis comprises calculating a moving-window centrality measure and a moving-window variability measure of the plurality of images.

11. The method recited in claim 10 wherein the moving-window centrality measure comprise a moving-window mean and the moving-window variability measure comprises a moving-window standard deviation.

12. The method recited in claim 10 wherein the moving-window centrality measure comprises a moving-window mean and the moving-window variability measure comprises a moving-window range.

13. The method recited in claim 5 wherein:
generating the plurality of texture measures further comprises applying a multidimensional scaling to map the plurality of texture measures to a point in a multidimensional space; and
determining whether the generated plurality of texture measures is consistent with the sample being authentic unconcealed biological tissue comprises determining whether the point is in a predefined region of the multidimensional space.

14. The method recited in claim 13 wherein the multidimensional space is a two-dimensional space.

15. A method of evaluating genuineness of a sample presented for biometric evaluation, the method comprising:
illuminating with illumination optics the sample with light having a plurality of different wavelengths;
receiving via detection optics light scattered from the sample for each of the different wavelengths;
forming a plurality of images, each such image being formed from the received light for a respective one of the different wavelengths; and
analyzing the plurality of images using a computational device, wherein the analyzing comprises:
generating a plurality of image contrast measures, each such image contrast measure being generated from one of the plurality of images by performing a spatial moving-window analysis of the one of the plurality of images; and
determining from the plurality of image contrast measures whether the sample has an image contrast under red illumination that is less than an image contrast under blue illumination.

16. The method recited in claim 15 wherein performing the spatial moving-window analysis comprises calculating a moving-window Fourier transform on the one of the plurality of images.

17. The method recited in claim 15 wherein performing the spatial moving-window analysis comprises calculating a moving-window centrality measure and a moving-window variability measure of the one of the plurality of images.

18. The method recited in claim 15 wherein:
determining from the plurality of image contrast measures whether the sample has an image contrast under red illumination less than an image contrast under blue illumination comprises applying a multidimensional scaling to map the plurality of image contrast measures to a point in a multidimensional space; and
determining whether the point is in a predefined region of the multidimensional space.

19. An apparatus for evaluating genuineness of a sample presented for biometric evaluation, the apparatus comprising:
means for illuminating the sample with light having a plurality of different wavelengths;
means for receiving light scattered from the sample for each of the plurality of distinct optical conditions;
means for forming a plurality of images, each such image being formed from the received light for a respective one of the plurality of distinct optical conditions;
means for generating a plurality of texture measures, each such texture measure being generated from a respective one of the plurality of images; and
means for determining whether the generated plurality of texture measures is consistent with the sample being authentic unconcealed biological tissue.

20. The apparatus recited in claim 19 wherein the means for generating the plurality of texture measures comprises means for performing a spatial moving-window analysis of each of the plurality of images.

21. The apparatus recited in claim 20 wherein:
the means for generating an optical contrast measure further comprises means for generating a multidimensional scaling to map a figure of merit to a point in a multidimensional space; and
the means for determining whether the generated plurality of texture measures is consistent with the sample being authentic unconcealed biological tissue comprises means for determining whether the point is in a predefined region of the multidimensional space.

* * * * *

UNITED STATES PATENT AND TRADEMARK OFFICE
CERTIFICATE OF CORRECTION

PATENT NO. : 7,668,350 B2  Page 1 of 1
APPLICATION NO. : 11/219006
DATED : February 23, 2010
INVENTOR(S) : Robert K. Rowe It is certified that error appears in the above-identified patent and that said Letters Patent is hereby corrected as shown below:

Cover Page, (63), Related U.S. Application Data, line 3, delete "which" and insert --and--

Cover Page, (63), Related U.S. Application Data, line 5, delete "which" and insert --and--

Cover Page, (63), Related U.S. Application Data, line 8, delete "which" and insert --and--

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,668,350 B2 Page 1 of 1
APPLICATION NO. : 11/219006
DATED : February 23, 2010
INVENTOR(S) : Rowe It is certified that error appears in the above-identified patent and that said Letters Patent is hereby corrected as shown below:

Title Page, Item [*]

Delete the phrase "by 617 days" and insert -- by 1135 days --.

Signed and Sealed this

Tenth Day of August, 2010

David J. Kappos
*Director of the United States Patent and Trademark Office*